US008848627B2

(12) United States Patent
Yuk et al.

(10) Patent No.: US 8,848,627 B2
(45) Date of Patent: Sep. 30, 2014

(54) METHOD FOR ALLOCATING CONTROL CHANNEL

(75) Inventors: Young Soo Yuk, Anyang-si (KR); Jeong Ki Kim, Anyang-si (KR); Young Seob Lee, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 401 days.

(21) Appl. No.: 12/919,388

(22) PCT Filed: Feb. 27, 2009

(86) PCT No.: PCT/KR2009/000957
§ 371 (c)(1),
(2), (4) Date: Sep. 22, 2010

(87) PCT Pub. No.: WO2009/108010
PCT Pub. Date: Sep. 3, 2009

(65) Prior Publication Data
US 2011/0002293 A1 Jan. 6, 2011

Related U.S. Application Data

(60) Provisional application No. 61/032,060, filed on Feb. 27, 2008, provisional application No. 61/035,052, filed on Mar. 10, 2008, provisional application No. 61/036,481, filed on Mar. 14, 2008, provisional application No. 61/037,615, filed on Mar. 18, 2008, provisional application No. 61/042,785, filed on Apr. 7, 2008, provisional application No. 61/042,786, filed on Apr. 7, 2008, provisional application No. 61/043,739, filed on Apr. 10, 2008, provisional application No. 61/044,912, filed on Apr. 15, 2008, provisional application No. 61/046,455, filed on Apr. 21, 2008.

(30) Foreign Application Priority Data

Jul. 7, 2008 (KR) .................. 10-2008-0065716
Aug. 13, 2008 (KR) .................. 10-2008-0079430
Aug. 13, 2008 (KR) .................. 10-2008-0079431

(51) Int. Cl.
*H04W 72/04* (2009.01)

(52) U.S. Cl.
CPC .................. *H04W 72/0406* (2013.01)
USPC ....................................... 370/329

(58) Field of Classification Search
None
See application file for complete search history.

(56) References Cited

U.S. PATENT DOCUMENTS

| 7,339,921 B2* | 3/2008 | Kim et al. ............. 370/349 |
| 2001/0017849 A1* | 8/2001 | Campanella et al. ..... 370/326 |
| 2005/0232181 A1 | 10/2005 | Park et al. |
| 2007/0086474 A1 | 4/2007 | Lee et al. |

(Continued)

FOREIGN PATENT DOCUMENTS

| KR | 10-2005-0091597 A | 9/2005 |
| KR | 10-2007-0050579 A | 5/2007 |

(Continued)

OTHER PUBLICATIONS

Yaghoobi et al., "Scalable OFDMA Physical Layer in IEEE 802.16 WirelessMAN," Intel Technology Journal, vol. 8, Issue 3, Aug. 20, 2004, pp. 201-212.

(Continued)

*Primary Examiner* — Huy D Vu
*Assistant Examiner* — Bao G Nguyen
(74) *Attorney, Agent, or Firm* — Birch, Stewart, Kolasch & Birch, LLP

(57) ABSTRACT

A method for allocating a submap is disclosed. The method includes configuring a subframe including one or more resource areas according to a size of the submap, allocating the submap and a control header including subframe configuration information and submap information to the one or more resource areas, and transmitting the control header.

15 Claims, 18 Drawing Sheets

(56) References Cited

U.S. PATENT DOCUMENTS

| | | |
|---|---|---|
| 2007/0121636 A1 | 5/2007 | Kim et al. |
| 2007/0133481 A1 | 6/2007 | Stanwood et al. |
| 2008/0165881 A1* | 7/2008 | Tao et al. ............. 375/267 |
| 2008/0192622 A1* | 8/2008 | Scheim et al. ......... 370/210 |
| 2009/0129268 A1* | 5/2009 | Lin et al. ............... 370/231 |
| 2010/0118800 A1* | 5/2010 | Kim et al. .............. 370/329 |

FOREIGN PATENT DOCUMENTS

| | | |
|---|---|---|
| WO | WO 2006/065069 A1 | 6/2006 |
| WO | WO 2008/011330 A1 | 1/2008 |

OTHER PUBLICATIONS

Yuk et al., "Downlink Control Signaling for Frame Structure Design of IEEE 802.16m," IEEE 802.16 Broadband Wireless Access Working Group <http://ieee802.org/16>, C8021m_08/091r1, Jan. 16, 2008, 16 pages.

Yuk et al., "Subframe Control Channels of IEEE802.16m Systems," IEEE 802.16 Broadband Wireless Access Working Group <http://ieee802.org/16> C80216m_80/149. Mar. 10, 2008, 16 pages.

* cited by examiner

METHOD FOR ALLOCATING CONTROL CHANNEL

This application is the National Phase of PCT/KR2009/000957 filed on Feb. 27, 2009, which claims priority under 35 U.S.C. 119(e) to U.S. Provisional Application Nos. 61/032,060 filed on Feb. 27, 2008; U.S. Provisional Application No. 61/035,052 filed on Mar. 10, 2008; U.S. Provisional Application No. 61/036,481 filed on Mar. 14, 2008; U.S. Provisional Application No. 61/037,615 filed on Mar. 18, 2008; U.S. Provisional Application No. 61/042,785 filed on Apr. 7, 2008; U.S. Provisional Application No. 61/042,786 filed on Apr. 7, 2008; U.S. Provisional Application No. 61/043,739 filed on Apr. 10, 2008; U.S. Provisional Application No. 61/044,912 filed on Apr. 15, 2008; U.S. Provisional Application No. 61/046,455 filed on Apr. 21, 2008 and under 35 U.S.C. 119(a) to Patent Application Nos. 10-2008-0065716 filed in Republic of Korea on Jul. 7, 2008; Patent Application No. 10-2008-0079430 filed in Republic of Korea on Aug. 13, 2008 and Patent Application No. 10-2008-0079431 filed in Republic of Korea on Aug. 13, 2008, all of which are hereby expressly incorporated by reference into the present application.

TECHNICAL FIELD

The present invention relates to a subframe structure for a wireless access system, and more particularly, to a method for allocating a submap and a control channel.

BACKGROUND ART

A general frame structure for a wireless access system will be described below.

FIG. 1 illustrates a frame structure in a broadband wireless access system (e.g. Institute of Electrical and Electronic Engineers (IEEE) 802.16).

Referring to FIG. 1, in a frame, the horizontal axis represents Orthogonal Frequency Division Multiple Access (OFDM) symbols as time units, and the vertical axis represents the logical numbers of subchannels as frequency units. In FIG. 1, the frame is divided into data sequence channels each having a predetermined time period according to physical characteristics of the frame. That is, a frame includes a DownLink (DL) subframe and an UpLink (UL) subframe.

The DL subframe may include a preamble, a Frame Control Header (FCH), a DL-MAP, a UL-MAP, and one or more data bursts. The UL subframe may include one or more data bursts and a ranging subchannel.

In FIG. 1, the preamble is predetermined sequence data in the first symbol of every frame. With the preamble, a Mobile Station (MS) acquires synchronization to a Base Station (BS) or performs channel estimation. The FCH carries DL-MAP-related channel allocation information and channel code information. The DL-MAP and the UL-MAP are Medium Access Control (MAC) messages that carry DL and UL channel resource allocation information to MSs. The data bursts may be used for units of data directed from a BS to MSs or from MSs to a BS.

A Downlink Channel Descriptor (DCD) that can be used in FIG. 1 is a MAC message describing physical characteristics of a DL channel and an Uplink Channel Descriptor (UCD) that can be used in FIG. 1 is a MAC message describing physical characteristics of a UL channel.

Referring to FIG. 1, on the downlink, an MS detects the preamble transmitted from a BS and acquires synchronization to the BS using the preamble. Then the MS can decode the DL-MAP based on information acquired from the FCH. The BS can transmit scheduling information for DL or UL resource allocation to the MS every frame (e.g. every 5 ms) in the DL-MAP/UL-MAP message.

The DL-MAP/UL-MAP message structure illustrated in FIG. 1 may cause unnecessary MAP message overhead because the BS transmits the MAP messages at a Modulation and Coding Scheme (MCS) level that allows all MSs to receive the MAP messages commonly irrespective of their channel statuses.

For instance, MSs near to the BS are in good channel status and thus the BS may use a high MCS level (e.g. Quadrature Phase Shift Keying (QPSK) 1/2) for message encoding and decoding for the nearby MSs. Nonetheless, the BS encodes the MAP messages at a low MCS level (e.g. QPSK 1/12) for MSs at a cell boundary. Therefore, each MS should receive the MAP messages encoded at the same MCS level irrespective of its channel status. As a consequence, unnecessary MAP message overhead may be created.

A resource allocation unit may vary with wireless access systems. For example, resources are allocated every 5-ms frame in an IEEE 802.16e system and every 1-ms Transmit Time Interval (TTI) in a $3^{rd}$ Generation Partnership Project Long Term Evolution (3GPP LTE) system. A MAP exists in every resource allocation unit, for radio resource allocation. In this context, a dedicated MAP is required for each MS in order to increase frequency efficiency and reduce the complexity of the MS.

3GPP LTE defines such a MAP message as a Downlink Control Indicator (DCI) and transmits the DCI on a Physical Downlink Control Channel (PDCCH) in the physical layer. There is a DL channel for delivering an ACKnowledgment/Negative ACKnowledgment (ACK/NACK) for an UpLink Shared Channel (UL-SCH). The DCI can be transmitted on a Physical Hybrid-ARQ Indicator Channel (PHICH) in 3GPP LTE.

FIG. 2 illustrates an exemplary subframe structure in the 3GPP LTE system.

Referring to FIG. 2, the positions of allocated Control Channel Elements (CCEs) and the position of a Reference Signal (RS) allocated for each antenna, for channel estimation are marked in a Resource Block RB). In the illustrated case of FIG. 2, a bandwidth of 1.25 MHz is used.

In a wireless access system (e.g. 3GPP LTE) system, a plurality of CCEs can be transmitted in first n OFDMA symbols of each subframe. A CCE may refer to a control information transmission unit. One CCE can be disposed in successive or distributed time-frequency areas.

One subframe has 14 OFDM symbols in the 3GPP LTE system. The first to three ones of the 14 OFDM symbols can be used for transmitting a Physical CFI Channel (PCFICH), a PDCCH, and a PHICH. This amounts to an overhead of about 7.1% (in case of one symbol) to 21.4% (in case of three symbols).

In FIG. 2, a Resource Unit (RU) is a basic allocation unit defined by 12 subcarriers and 14 symbols. The first one to three OFDMA symbols of an RB are occupied for control channels. Each control channel is composed of 4×1 basic units called mini Channel Elements (CEs).

The first symbol carries a PCFICH for transmitting a Control Frame Indicator (CFI). The CFI describes the number of symbols used for a control channel, occupying a total of four mini CEs. The first symbol also carries a PHICH for transmitting a Hybrid Automatic Repeat reQuest (HARQ) ACK/NACK (e.g. A/N mini CEs) for UL data. A PDCCH is delivered in the remaining control channel area. The PDCCH is allocated in units of CCEs. Each CCE may have nine mini CEs. To achieve frequency diversity, the CCE has mini CEs at different positions along the frequency axis.

In the 3GPP LTE system, a PDCCH allocated to each MS can be detected by blind detection. However, the blind detection is complex because it should be repeated tens of times (e.g. 40 to 50 times) depending on the total number of MAPs. Moreover, since as much blind decoding is required, the complexity increases considerably.

Aside from allocation of radio resources (e.g. a control channel) in symbols to a frame, there is a method for allocating radio sources in a plurality of subchannels along the frequency axis. The symbol-based control channel allocation is referred to as Time Division Multiplexing (TDM) and the subchannel-based control channel allocation is referred to as Frequency Division Multiplexing (FDM).

Despite the advantage of allocating radio resources to control channels at various ratios, the frequency-based radio resource allocation method allows data channel decoding only after control channel decoding, thus causing a time delay. The time delay may bring about one-subframe Round Trip Time (RTT) at worst in a system using subframes. Especially a Time Division Duplex (TDD) system may suffer from an about one-frame time delay (e.g. 5 ms in IEEE 802.16e).

If a submap occupies a whole OFDM symbol as done in a general TDM scheme, a DL subframe without a UL submap results in a great waste of unused subchannels.

In the case of scheduling for persistent control or Voice over Internet Protocol (VoIP), the use of submaps may further be reduced. Therefore, allocation of one entire OFDM symbol for a submap in every subframe leads to serious resource consumption.

DISCLOSURE

Technical Problem

An object of the present invention devised to solve the problem lies on a novel subframe structure.

Another object of the present invention devised to solve the problem lies on a method for allocating a submap or a UL control channel for use in a novel subframe structure.

Technical Solution

The object of the present invention can be achieved by providing a method for allocating a submap, including configuring a subframe including one or more resource areas according to a size of the submap, allocating the submap and a control header including subframe configuration information and submap information to the one or more resource areas, and transmitting the control header.

Each of the one or more resource areas may be configured by control allocation units comprising predetermined resource units. The predetermined resource units may be distributed across a total frequency area of the subframe in a predetermined order.

The step of allocating resource area may further include step of rearranging one or more control allocation units included in the one or more resource areas in a predetermined order in a predetermined symbol, and permuting a predetermined control allocation unit among the one or more control allocation units. The rearrangement may include changing an allocation sequence of the one or more control allocation units using a predetermined rotation value.

The predetermined resource units included in the control allocation unit may be spaced from one another by the number of the resource units in a total frequency area of the subframe.

The method may further include calculating a total amount of required resources for the submap in terms of the number of symbols each including predetermined subchannels. If the total amount of required resources for the submap is less than one symbol, the control header and submap allocation may include allocating the control header and a downlink submap to a first control allocation unit in time division multiplexing.

The control header and submap allocation may include allocating the control header and the downlink submap to the first control allocation unit and allocating an uplink submap to a remaining subchannel area of the first control allocation unit.

If the entire uplink submap is not allocated to the first control allocation unit, the uplink submap may be allocated using a second control allocation unit additionally.

The submap allocation may further include calculating a total amount of required resources for the submap in terms of the number of symbols each including a predetermined number of subchannels. If the total amount of required resources for the submap is larger than one symbol, the control header and submap allocation may include allocating the control header and the submap to a first symbol of the resource area and allocating a remaining part of the submap to a second symbol of the resource area. The submap may include a downlink submap and an uplink submap, and the uplink submap may be allocated to a remaining area after the downlink submap is allocated.

In another aspect of the present invention, provided herein is a method for allocating a submap, including transmitting a supermap including Modulation Coding Scheme (MCS) information about a Subframe Control Header (SFCH), and transmitting the SFCH modulated according to the MCS information, the SFCH including subframe information about a subframe to which a submap is allocated and scheduling information about the submap.

The MCS information may describe an MCS set including one or more MCS levels. The SFCH may be modulated at a lowest of the MCS levels included in the MCS information. The subframe information may include information about distributions of distributed resource blocks and localized resources blocks. The subframe information may further include subframe grouping information. The information about the distributions of the distributed resource blocks and the localized resources blocks may be one of a predetermined index indicating a distribution of resource blocks, a bitmap indicating positions of the distributed resource blocks, and information about a ratio between the distributed resource blocks and the localized resource blocks.

The submap scheduling information may include at least one of information about positions of control allocation units to which the submap is allocated in a subframe and information about the number of the control allocation units. The SFCH may further include resource allocation information for allocating a predetermined message and the resource allocation information may include information about resource blocks allocated to the predetermined message and information about the number of the resource blocks. The resource allocation information may indicate only a size of a resource block after a start position of a data burst is fixed.

The SFCH may further include MCS information about a next submap header. The supermap may further include information about a position of the SFCH.

In a further aspect of the present invention, provided herein is a method for allocating a submap, including determining an MCS level of an SFCH to be a lowest MCS level according to a communication environment, and transmitting the SFCH modulated at the MCS level, the SFCH including subframe information about a subframe to which the submap is allocated and scheduling information about the submap.

In still another aspect of the present invention, provided herein is a method for receiving a submap, including receiving a supermap including MCS information about an SFCH, receiving the SFCH modulated according to the MCS information, the SFCH including subframe information about a subframe to which the submap is allocated and scheduling information about the submap, and demodulating the SFCH using the MCS information.

In yet another aspect of the present invention, provided herein is a method for allocating a submap, including allocating a predetermined resource area to a subframe according to a size of a submap and allocating a downlink submap to the predetermined resource area in time division multiplexing.

The submap allocation method may further include transmitting an SFCH including subframe configuration information and submap information and transmitting the submap according to the submap information. The submap information may include at least one of information about a position of the submap and information about a size of the submap.

If the size of the submap is less than one symbol including predetermined subchannels, the submap allocation method may further include allocating an uplink submap in a remaining resource area after the downlink submap is allocated.

If the size of the submap is larger than one symbol including predetermined subchannels, the submap allocation method may further include allocating the uplink submap in a predetermined resource area in frequency division multiplexing. The uplink submap may be allocated in a remaining resource area after the downlink submap is allocated and a remaining part of the uplink submap may be allocated in frequency division multiplexing.

If the size of the submap is less than one symbol including predetermined subchannels, a remaining resource area after the downlink submap is allocated may be used to measure signal interference from other base stations.

The predetermined resource area may include one or more control allocation units each having one or more resource blocks. The subframe may have 6 symbols in time and 12 subchannels in frequency.

In yet further aspect of the present invention, provided herein is a method for allocating a submap, including allocating one or more resources areas to be allocated to the submap to a subframe, allocating a downlink submap to a first resource area among the one or more resources areas in time division multiplexing, and allocating an uplink submap to a second resource area among the one or more resources areas in frequency division multiplexing. A remaining area of the first resource area after the allocation of the downlink submap may be used to measure signal interference.

The submap allocation method may further include allocating an SFCH including subframe configuration information and submap information to the first resource area before the allocation of the downlink submap. The submap information may include at least one of information about a position of the submap and information about a size of the submap.

Advantageous Effects

The present invention has the following effects.

Firstly, DL control channels can be allocated efficiently in a wireless access system having short subframes according to exemplary embodiments of the present invention.

Secondly, the problems of time delay and increased overhead can be solved by providing a method for efficiently allocating a submap or a control channel in a wireless access system having short subframes.

Thirdly, the number of excessive blind detections, which is a problem encountered with legacy wireless access systems, is decreased. Therefore, an increased complexity of MSs is mitigated.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
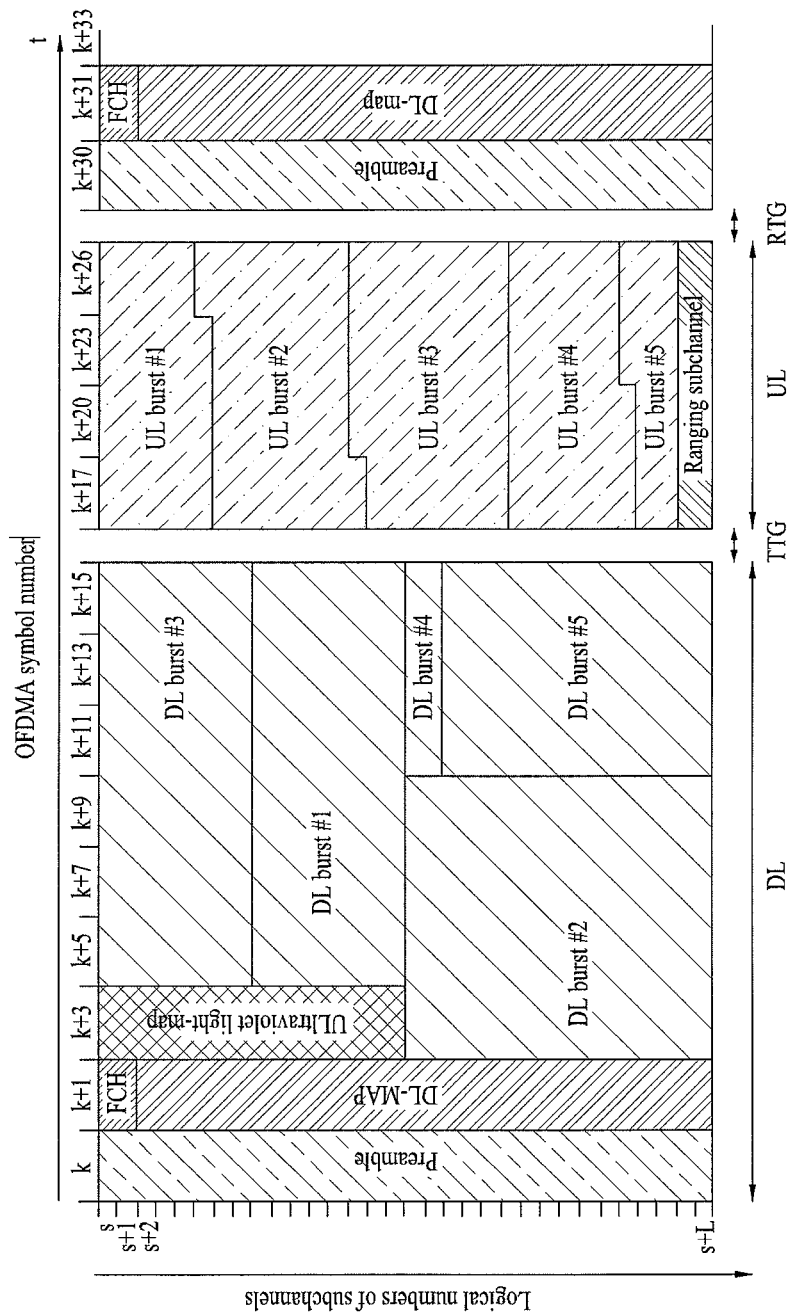
FIG. 1 illustrates a frame structure in a broadband wireless access system (e.g. IEEE 802.16).
Figure 2:
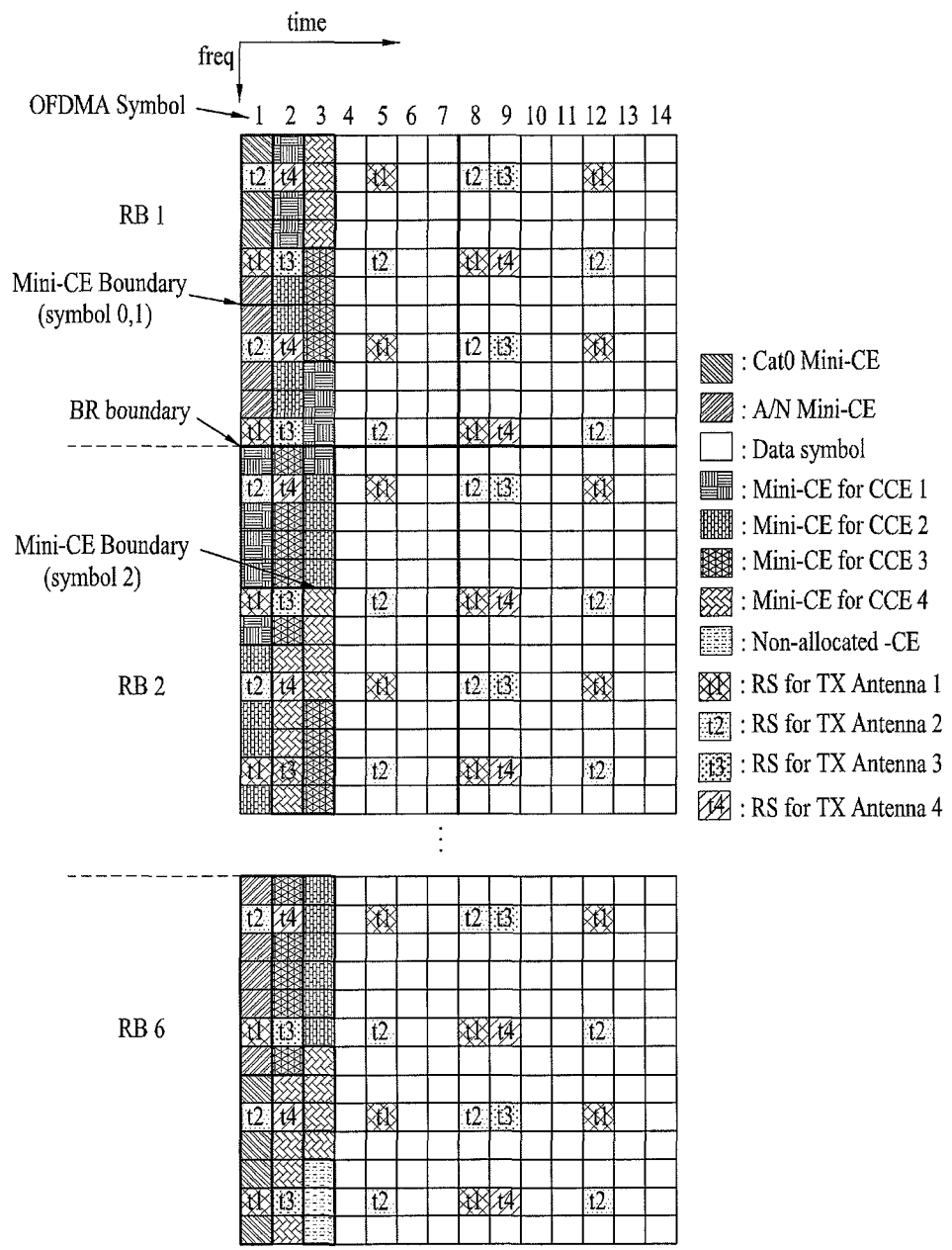
FIG. 2 illustrates an exemplary subframe structure in a 3GPP LTE system.

To achieve the above-described objects, the present invention relates to a subframe structure and a method for allocating a submap and a control channel in a wireless access system.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In exemplary embodiments of the present invention, a description is made of a data transmission and reception relationship between a BS and an MS. Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B' (eNB), or 'access point', etc. The term 'MS' may be replaced with the term 'User Equipment (UE)', 'Terminal', or 'Mobile Subscriber Station' (MSS), etc.

The exemplary embodiments of the present invention may be achieved by various means, for example, hardware, firmware, software, or a combination thereof.

In a hardware configuration, a method for allocating a control channel according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, and microprocessors, etc.

In a firmware or software configuration, a method for allocating a control channel according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

Figure 3:
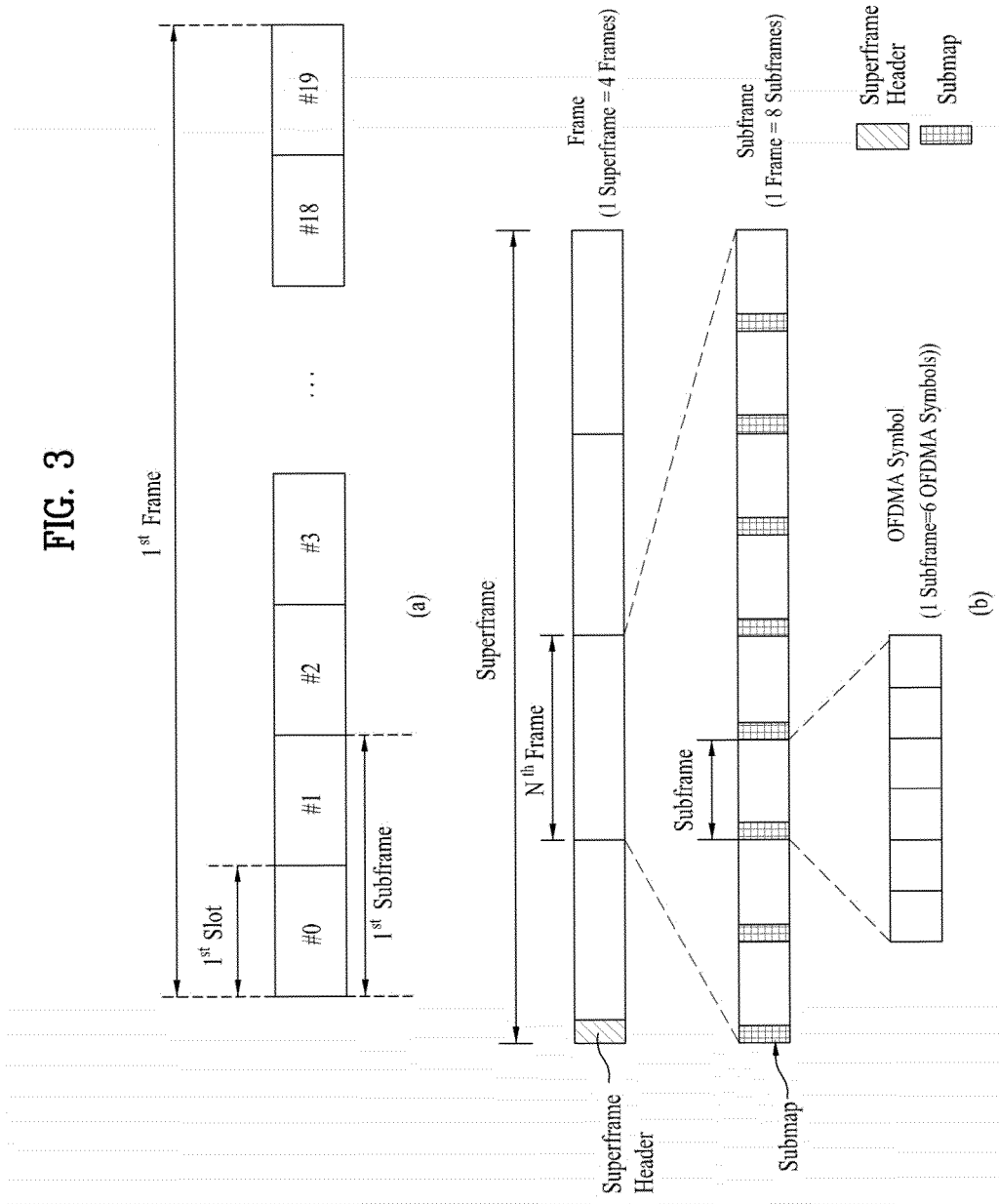
FIG. 3 illustrates a general frame structure (a) and a frame structure (b) to which exemplary embodiments of the present invention can be applied.

FIG. 3 illustrates a general frame structure (a) and a frame structure (b) to which exemplary embodiments of the present invention can be applied.

FIG. 3(a) illustrates an exemplary frame structure in a 3GPP LTE system. Referring to FIG. 3(a), a frame (10 ms) may include 10 subframes, each subframe (1 ms) having two slots.

A BS can generate and transmit a dedicated control channel to each MS, for allocating transmission and reception resources to the MS. The MS can transmit and receive actual data using information included in the control channel. The control channel may include resource allocation information, Multiple-Input Multiple-Output (MIMO)-related information, coding and modulation information, and Hybrid Automatic Repeat reQuest (HARQ) information. The information of the control channel can be defined as a Downlink Control Indicator (DCI). The DCI is transmitted on a Physical Downlink Control Channel (PDCCH) in a physical layer after predetermined channel coding and multiplexing.

Referring to FIG. 3(b), a superframe may include one or more frames and each frame may include one or more subframes. Each subframe may include one or more OFDMA symbols.

The lengths and numbers of superframes, frames, and symbols depend on user requirements or system environments. The term "subframe" is used in the exemplary embodiments of the present invention. The "subframe" refers to every lower frame structure resulting from dividing one frame to a predetermined length.

A frame, to which exemplary embodiments of the present invention can be applied, can be divided into one or more subframes. The number of subframes in a frame can be determined according to the number of symbols per subframe. If a frame includes 48 symbols and each subframe includes 6 symbols, the frame can be divided into 8 subframes. When each subframe occupies 12 symbols, the frame can include 4 subframes.

In the illustrated case of FIG. 3(b), it is assumed that the superframe is 20 ms long and each frame is 5 ms long. In other words, the superframe has 4 frames and each frame includes 8 subframes. Herein, 6 OFDMA symbols can form one subframe.

In FIG. 3(b), a superframe header may reside in the first subframe of the superframe. The superframe header can include a Broadcast Channel (BCH) and functions to control and schedule the superframe. Accordingly, the superframe header may further include control information other than the BCH.

A description will now be made of a Control Channel (CCH) structure that can be applied to the proposed subframe structure.

The following control channels are considered in exemplary embodiments of the present invention.

DL scheduling channel
UL scheduling channel
ACK/NACK channel for a UL burst

The DL and UL scheduling channels each have a logical structure called submap and the ACK/NACK channel can be configured as an independent control channel. Hereinbelow, a submap structure will be described separately in terms of physical and logical structures.

<Physical Channel Structure of Submap>

Figure 4:
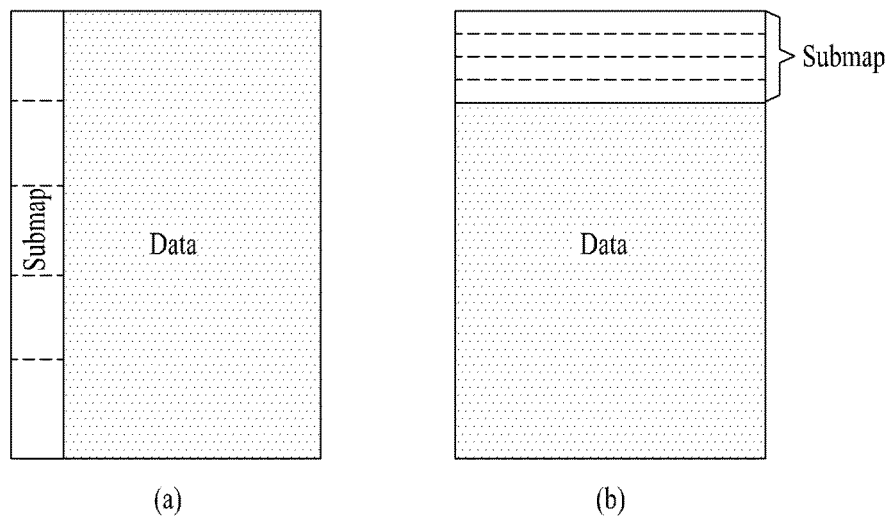
FIG. 4 illustrates a TDM scheme (a) and an FDM scheme (b) to which exemplary embodiments of the present invention can be applied.

FIG. 4 illustrates a TDM scheme (a) and an FDM scheme (b) to which exemplary embodiments of the present invention can be applied.

A submap can be allocated in symbols (time) or in subchannels (frequency). The former method is called Time Division Multiplexing (TDM) and the latter method is called Frequency Division Multiplexing (FDM).

Table 1 below compares the advantages and shortcomings of TDM and FDM.

TABLE 1

|  | TDM | FDM |
|---|---|---|
| Advantages | The decoding delay of control information is short. In the absence of data to be received at an MS, power consumption can be reduced by turning off a Radio Frequency (RF) module for about two or three symbol periods (200 to 300 ms) by use of micro-sleep. Resources can be allocated independently to a control channel area and a data area. | The ratio of control channels can be adjusted in various units. An unused channel area is relatively small. A control channel area and a data area can be used independently, although in a limited manner. |
| Shortcomings | A unit for controlling the ratio of control channels to an entire subframe is 16.667%, relatively large. Overhead is large on the whole. An actually unused control channel area exists, thus decreasing frequency efficiency. Reference: control channel-to-subframe ratio 3GPP LTE: 7.1% (one symbol), 14.3% (two symbols), 21.7% (three symbols). WiMAX (IEEE 802.16m): 6 symbols/30DL = 20% | The decoding delay of control information is long. A memory capacity requirement is large because every input signal should be buffered until control information is completely decoded. Micro-sleep is unviable. Frequency diversity gain is relatively small. |

Figure 5:
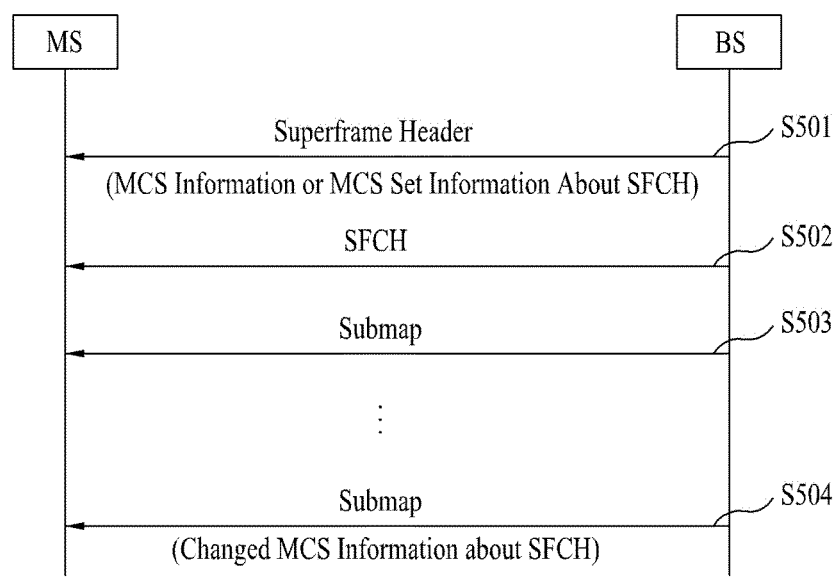
FIG. 5 illustrates a method for allocating a subframe control header according to an exemplary embodiment of the present invention.

FIG. 5 illustrates a method for allocating a subframe control header according to an exemplary embodiment of the present invention.

A Subframe Control Header (SFCH), to which exemplary embodiments of the present invention can be applied, may include subframe allocation information and submap allocation information. For instance, the SFCH may include at least one of subframe information, submap information, and message resource allocation information. The SFCH may further include MCS information about a next submap, optionally. One SFCH can be allocated per subframe. Apparently, the SFCH can be included in a submap. In this case, the SFCH is allocated only when the submap is allocated.

In FIG. 5, an SFCH may have a fixed MCS level. When the MCS level of the SFCH is changed, the BS can notify an MS of the changed MCS level by a superframe header or a supermap.

Referring to FIG. 5, the BS can transmit information about the MCS level of the SFCH to the MS in the superframe header. The SFCH of each subframe in a superframe may have the same MCS level all the way. Preferably, the MCS level of the SFCH is lowest during the duration of the superframe in step S501.

In step S502, the BS can transmit an SFCH encoded at the MCS level set in the superframe header to the MS. Since the MS has acquired the MCS information about the SFCH, it can decode the SFCH.

In step S503, the BS can transmit a submap including DL scheduling information and/or UL scheduling information to the MS. The MS can receive the submap using submap information included in the decoded SFCH and DL data using the DL scheduling information included in the submap. If the submap includes a UL submap, the MS can transmit UL data based on the UL scheduling information to the BS.

Referring to FIG. 5, the BS notifies the MS of the MCS level of the SFCH by the superframe header. It can be further contemplated that the BS notifies the MS of an MCS level set including one or more MCS levels, not a fixed MCS level for a superframe in step S501.

When the BS notifies the MS of the MCS level set, the lowest of the MCS levels of the MCS level set for the superframe can be used for the SFCH. If the BS changes the MCS level of the SFCH, it notifies the MS of the changed MCS level of the SFCH in a submap in step S504.

The MS can decode an SFCH using the changed MCS level in a next subframe in step S504.

<Subframe Structure>

Subframe structures and submap positions to which exemplary embodiments of the present invention can be applied will be described below.

In the exemplary embodiments of the present invention, a submap can be allocated to every subframe or to specific subframes. In the former case, each submap includes resource allocation information about a subframe. In the latter case, the submap includes resource allocation information about one or more subframes.

The concept "subframe grouping" is introduced in the exemplary embodiments of the present invention. Subframe grouping is to group two or more subframes into one group. For instance, if two subframes are grouped into one group, an RU size can be doubled, while the total number of RUs is kept unchanged, or the total number of RUs is doubled, while the RU size is kept the same. The term "RU" is a resource unit of a predetermined size, interchangeably used with "RB" in the exemplary embodiments of the present invention.

The BS transmits information about a subframe having a submap to the MS in a superframe header. That is, the BS notifies the MS of a predetermined submap cycle in a superframe header. For example, the BS can indicate N as a submap cycle to the MS by a superframe header. Then the MS can find out that a submap is present every N subframes.

Alternatively, the BS can notify the MS of the positions of subframes with submaps by a bitmap in a superframe header. For instance, '1' indicates the presence of a submap and '0' indicates the absence of a submap, in the bitmap. Submaps are allocated using a bitmap in the exemplary embodiments of the present invention. Yet, it is obvious that submaps can be allocated every predetermined period depending on user requirements.

In accordance with the exemplary embodiments of the present invention, submaps are categorized into a DL submap and a UL submap according to their usages. Unless otherwise specified, a submap covers both a DL submap and a UL submap in its sense.

Figure 6:
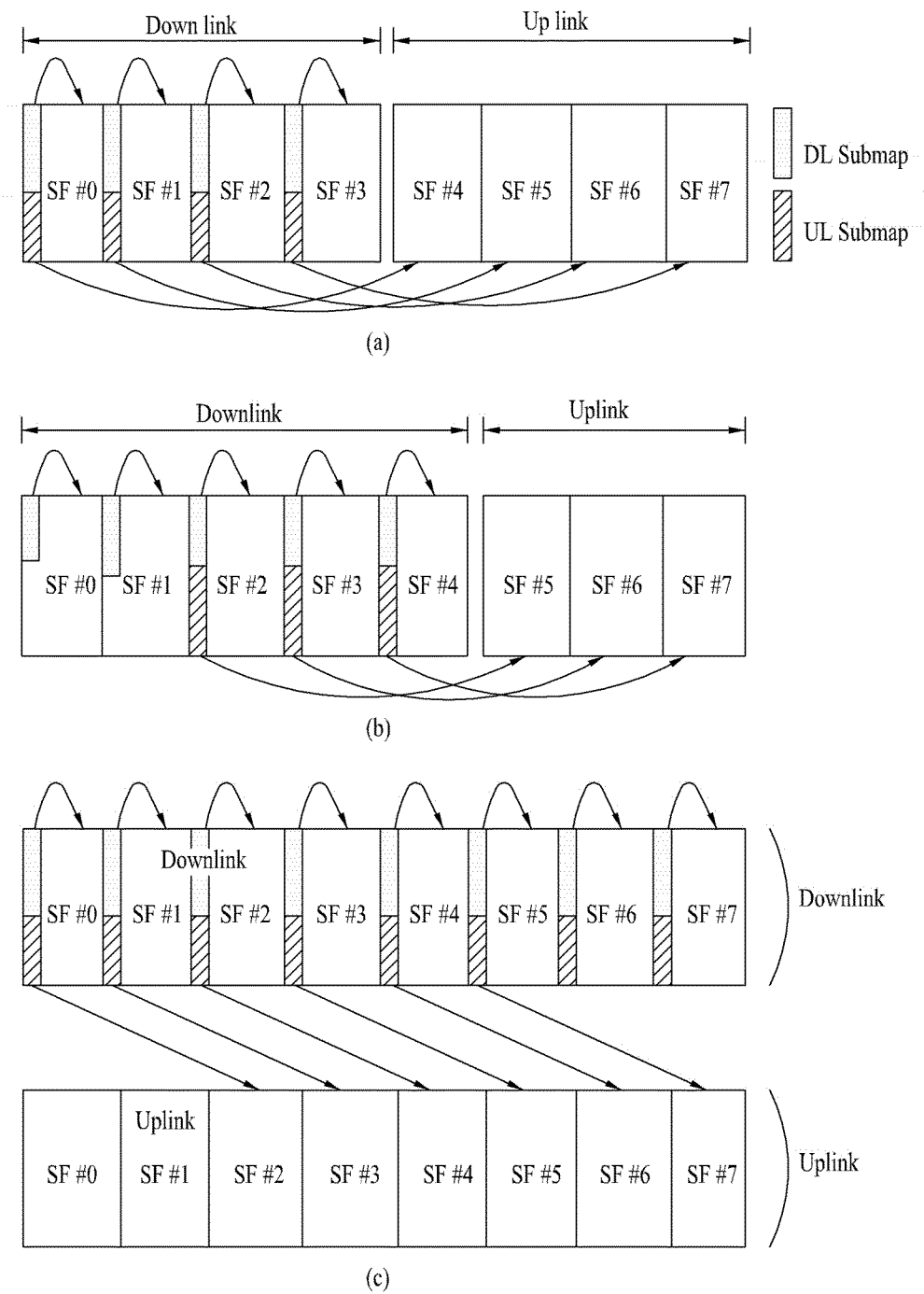
FIG. 6 illustrates exemplary subframe structures when a TTI is one subframe.

FIG. 6 illustrates exemplary subframe structures when a TTI is one subframe.

FIG. 6 is based on the assumption of a TTI of one subframe. FIG. 6(*a*) illustrates a DL subframe and a UL subframe that are symmetrical in a TDD system. The BS can transmit a superframe header including a bitmap of '0b1111/0000' to the MS. Therefore, the MS can detect subframes having submaps from the bitmap.

FIG. 6(*b*) illustrates a DL subframe and a UL subframe that are asymmetrical in number in a TDD system. The BS can transmit a superframe header including a bitmap of '0b11111/000' to the MS. Therefore, the MS can determine that first to fifth subframes, SF #0 to #4 have submaps.

FIG. 6(c) illustrates the positions of allocated submaps in an FDD system. The BS can transmit a superframe header including a bitmap of '0b11111111' to the MS. Therefore, the MS can determine based on the bitmap that all subframes have submaps.

Figure 7:
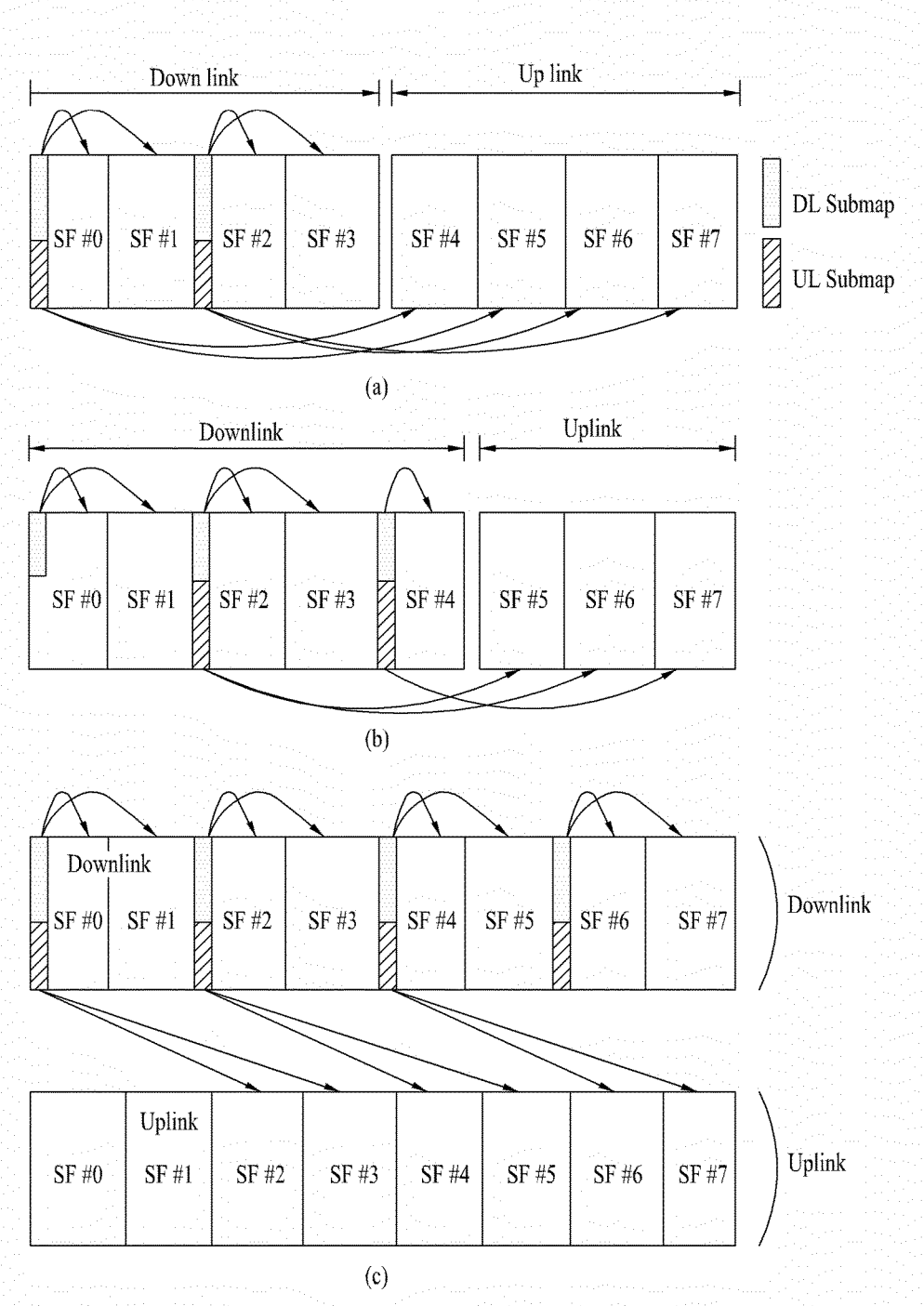
FIG. 7 illustrates exemplary subframe structures when a TTI is two subframes.

FIG. 7 illustrates exemplary subframe structures when a TTI is two subframes.

FIG. 7(a) describes a case where a BS transmits a bitmap of '0b1010/0000' in a superframe header to an MS. The bitmap indicates that first and third subframes, SF #0 and SF #2 have submaps. FIG. 7(b) describes a case where a BS transmits a bitmap of '0b10101/000' in a superframe header to an MS. Thus, the MS can find out from the bitmap that first, third and fifth subframes, SF #0, SF #2, and SF #4 have submaps.

FIG. 7(a) illustrates an exemplary subframe structure to which exemplary embodiments of the present invention can be applied. In FIG. 7(a), DL subframes and UL subframes are allocated symmetrically in TDD.

In FIG. 7(a), the first DL subframe SF #0 includes a DL submap and a UL submap. The DL submap may have DL scheduling information about subframes SF #0 and SF #1 and the UL submap may have UL scheduling information about subframes SF #4 and SF #5. In the third DL subframe SF #2, a DL submap may have DL scheduling information about subframes SF #2 and SF #3 and a UL submap may have UL scheduling information about subframes SF #6 and SF #7.

FIG. 7(b) illustrates DL subframes and UL subframes that are asymmetrically allocated in TDD.

Referring to FIG. 7B, the first DL subframe SF #0 includes a DL submap. The DL submap may have DL scheduling information about subframes SF #0 and SF #1. In the third DL subframe SF #2, a DL submap may have DL scheduling information about subframes SF #2 and SF #3 and a UL submap may have UL scheduling information about subframes SF #5 and SF #6. In the fifth DL subframe SF #4, a DL submap may have DL scheduling information about the subframe SF #4 and a UL submap may have UL scheduling information about a subframe SF #7.

FIG. 7(c) illustrates a subframe structure for an FDD system. With the subframe structure, the BS can also notify the MS of the positions of allocated submaps by a superframe header. That is, the BS can transmit a bitmap indicating the positions of submaps in a superframe header to the MS.

Referring to FIG. 7(c), the BS transmits a superframe header with '0b10101010' to the MS. Upon receipt of the bitmap, the MS can determine that submaps are allocated to first, third, fifth, and seventh subframes SF#0, SF#2, SF#4 and SF#6.

In FIG. 7(c), the DL submap of the subframe SF #0 can provide the MS with DL scheduling information about subframes SF #0 and SF #1. The DL submap of the subframe SF #2 can provide the MS with DL scheduling information about subframes SF #2 and SF #3. The DL submaps of the subframes SF #4 and SF #6 can provide the MS with DL scheduling information about subframes SF #4 and SF#5, and DL scheduling information about subframes SF #6 and SF#7, respectively.

UL submaps provide UL scheduling information to the MS. The same two sets of subframes are shown in FIG. 7(c). Considering radio resources are allocated along the frequency axis, i.e. in FDD in FIG. 7(c), the same subframe set is additionally shown to clarify the positions of UL scheduling information.

In FIG. 7(c), the UL submap of the subframe #0 has UL scheduling information about the subframes SF #2 and SF #3 and information about a UL control channel. The UL submap of the subframe #2 has UL scheduling information about the subframes SF #4 and SF #5 and information about a UL control channel.

Now a description will be made of submap allocation methods.

<Scalable TDM>

Figure 8:
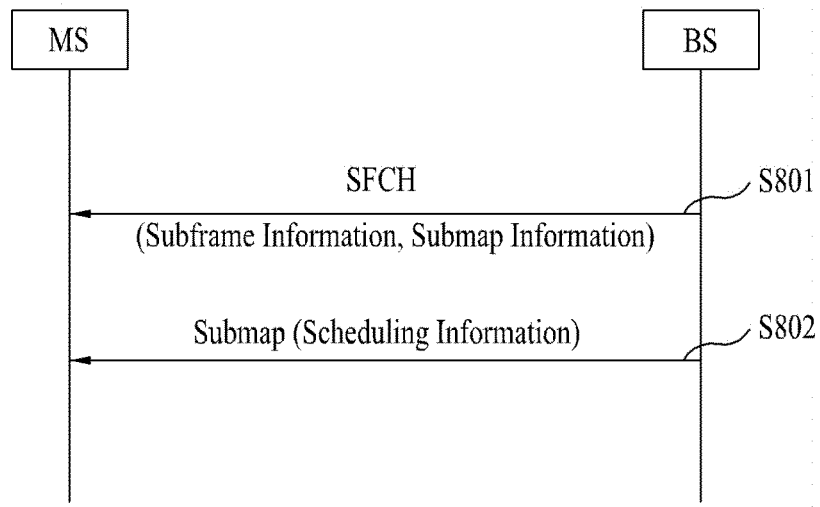
FIG. 8 illustrates a method for allocating a submap using an SFCH according to another exemplary embodiment of the present invention.

FIG. 8 illustrates a method for allocating a submap using an SFCH according to another exemplary embodiment of the present invention.

Referring to FIG. 8, the BS can transmit an SFCH including at least one of subframe information and submap information to the MS in step S801.

The subframe information may include subframe configuration information and information about the number of antennas in the BS. The subframe configuration information may include at least one of control channel allocation information, information about distributions of distributed RUs and localized RUs, and subframe grouping information. The submap information indicates the sizes of areas occupied by submaps. That is, the submap information may include information about the positions and lengths of submaps.

In accordance with another exemplary embodiment of the present invention, submaps are allocated at variable positions in TDM. Preferably, each submap is positioned in the first symbol of a subframe. Considering channel estimation and decoding delay, each submap is preferably disposed between the first and third symbols of a subframe.

In step S802, the BS can transmit a submap including scheduling information to the MS. The submap may include a UL submap as well as a DL submap.

Figure 9:
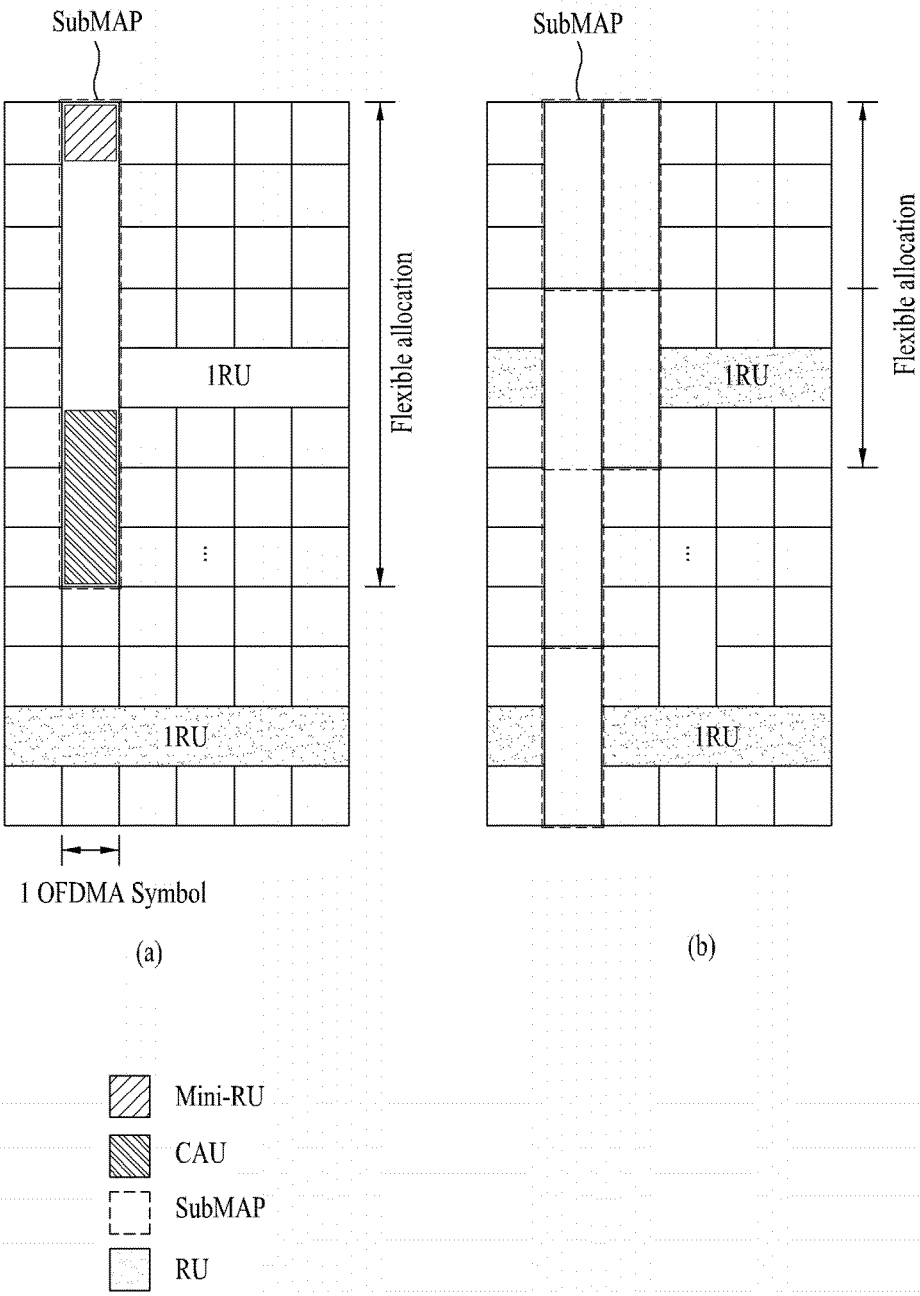
FIG. 9 illustrates a method for scalably allocating a submap in a subframe according to another exemplary embodiment of the present invention.

FIG. 9 illustrates a method for scalably allocating a submap in a subframe according to an exemplary embodiment of the present invention.

Referring to FIG. 9, the scalable TDM is proposed to solve a major problem encountered with TDM, i.e. large overhead. In the scalable TDM scheme, the BS can allocate a submap in a subframe on a symbol basis, for example. Yet, the submap is limited to a predetermined subchannel area of an OFDMA symbol, not occupying the entire OFDMA symbol.

A subframe may include six OFDM symbols and an RU (Resource Unit) can be defined by 18 subcarriers and 6 symbols. The subframe may be composed of one or more RUs. One symbol occupying 18 subcarriers in an RU can be defined as a mini RU.

In exemplary embodiments of the present invention, the BS can allocate a submap on the basis of a predetermined number of mini RUs. The predetermined number of mini RUs can be represented as a Control Allocation Unit (CAU). The number of mini RUs in a CAU may vary with a system situation or a user requirement. Hereinbelow, it is assumed that three mini RUs form one CAU.

The size of a CAU is preset by the BS. The BS can notify the MS of the CAU size on an upper control channel (e.g. a BCH or a supermap).

FIG. 9(a) illustrates a case where the total size of a submap allocated to a subframe is less than one symbol. Referring to FIG. 9(a), the submap is positioned in a second OFDM symbol of the subframe. The submap is disposed in a predetermined subchannel area, not occupying the whole OFDMA symbol. The submap can be allocated on a CAU basis and the size of the submap may vary with a user requirement or a channel environment.

FIG. 9(b) illustrates a case where the total size of a submap allocated to a subframe is larger than one symbol. Referring to FIG. 9(b), this submap allocation method increases the accuracy of channel estimation according to the positions of pilot symbols in a subframe.

The scalable TDM scheme can solve the low resolution-incurred problems of an overhead increase and resource dissipation encountered with the TDM scheme, while taking the advantages of the TDM scheme. While the scalable TDM scheme allocates a submap on a symbol basis, the length of the submap can be adjusted in units of one CAU or one subchannel.

The submap allocation methods illustrated in FIG. 9 will be described in brief. The BS first calculates the total amount of required resources for a submap in terms of the number of OFDMA symbols. If the submap requires resources less than one symbol (refer to FIG. 9(a)), the BS divides resources on a CAU basis and allocates an SFCH, a DL submap, and a UL submap in this order to the MS.

If the submap requires more resources than one symbol (refer to FIG. 9(b)), the BS allocates a DL submap to one symbol and the remaining space of the symbol to a UL submap. If the whole UL submap cannot be mapped to the remaining space, the UL submap is allocated to an RU by adding as many CAUs as needed in the next symbol.

Figure 10:
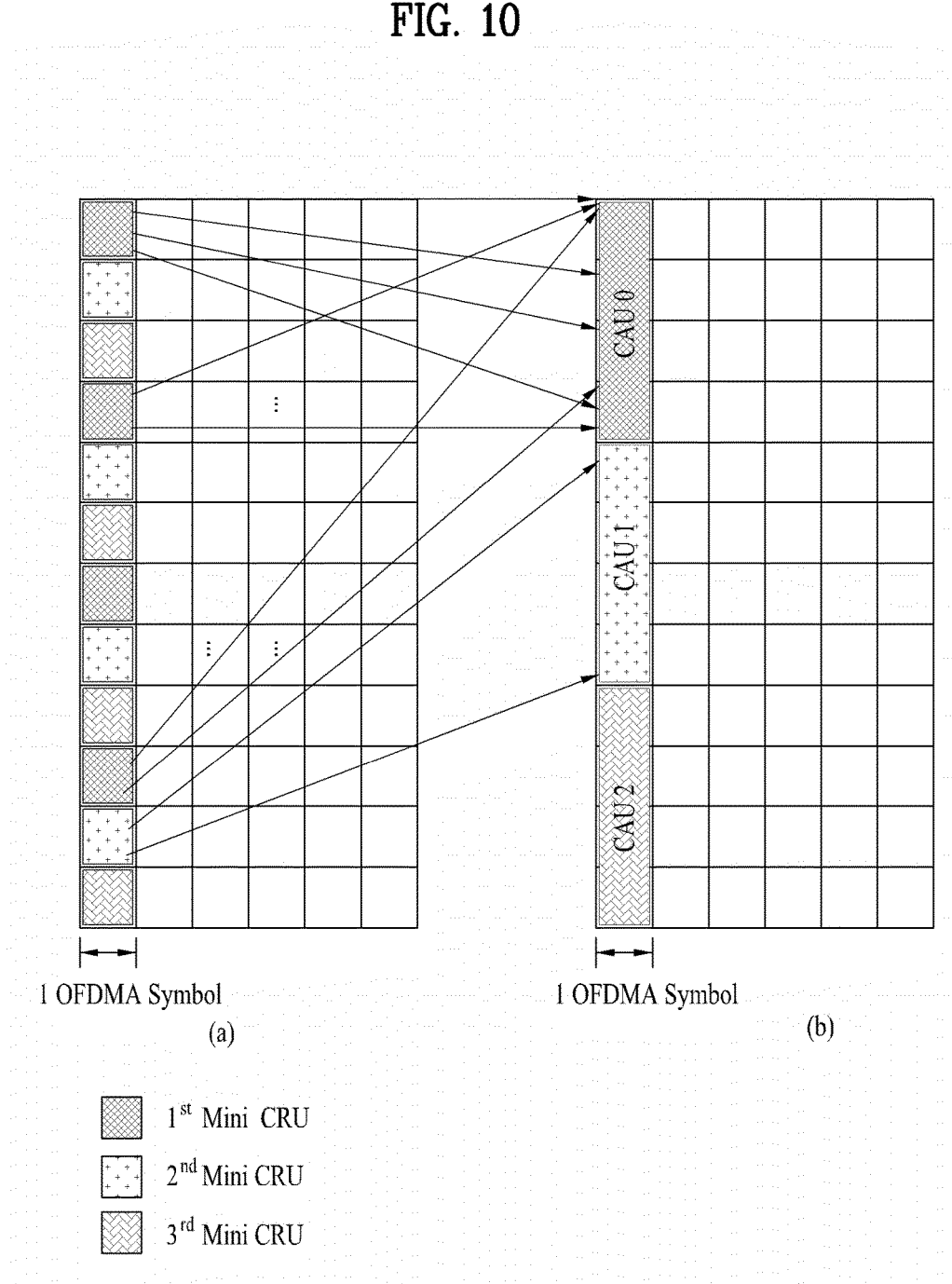
FIG. 10 illustrates a method for allocating physical channels to logical channels, to which exemplary embodiments of the present invention can be applied.

FIG. 10 illustrates a method for allocating physical channels to logical channels, to which exemplary embodiments of the present invention can be applied.

A method for allocating physical RUs to logical channels will be described. An OFDMA symbol may include 12 mini RUs and be divided into three CAUs. In this case, four physically distributed mini RUs are mapped to one logical CAU. The RU-CAU mapping can be carried out in various manners. Assuming that there are N RUs in total and one OFDMA symbol includes M CAUs, the size of each CAU can be N/M.

For example, for N=48 and 12 CAUs in total, the size of each CAU is 4. In another example, if N=48 and a CAU size is 16, an OFDMA symbol has three CAUs.

In the case of three CAUs, the CAUs can be used in the same manner as segments applied to an FCH in the IEEE 802.16 system. Although segments can be allocated sequentially in a numerical order (1, 2, 3) according to the positions of cells, the allocation order can be changed, taking into account inter-cell interference. For example, for three cells, the segments are allocated to a first cell in the order of 1, 2, 3, to a second cell in the order of 2, 3, 1 and to a third cell in the order of 3, 1, 2.

The cells for which the segments are allocated in different orders can be indicated to the MS by a superframe header (or a supermap) that is transmitted every 20 ms, or on a frame control channel. The total number of segments may vary with a bandwidth and a system. For instance, preferably, three or four segments are configured for a 10-MHz band.

Three types of RBs can be defined according to CAU sizes. If a CAU size is less than one OFDMA symbol, there can be an RU occupying 5 OFDMA symbols and an RU occupying 6 OFDMA symbols, as illustrated in FIG. 9(a). If the CAU size is larger than one OFDMA symbol, there can be an RU occupying 4 OFDMA symbols and an RU occupying 5 OFDMA symbols, as illustrated in FIG. 9(b). Obviously, the size of an RU may vary with a user requirement or a system environment.

In the scalable TDM scheme, the BS can indicate the total size of a submap to all MSs, for allocation of RBs. To do so, the BS transmits an SFCH including submap allocation information to the MSs. The SFCH may include other subframe information in addition to the submap allocation information. The SFCH may reside in the first symbol of a subframe, for providing subframe configuration information. Preferably, the size of the SFCH is set to be less than one CAU.

The scalable TDM scheme illustrated in FIG. 10 is efficient, especially in a TDD system where DL subframes and UL subframes are symmetrically arranged. A case where the ratio between DL subframes and UL subframes is 5:3 will be described, by way of example. In FIG. 10, a submap, which may include a DL submap and/or a UL submap, exists in a DL subframe.

In accordance with the exemplary embodiments of the present invention, a DL submap may exist in every DL subframe, but a UL submap can exist only in three or fewer DL subframes having predetermined subframe offsets. Hence, a submap having only a DL submap differs significantly in position and size from a submap having both a DL submap and a UL submap.

That is, submaps in three DL subframes are very different in position and size from submaps in the other two DL subframes. If each submap occupies a whole OFDMA symbol as in a general TDM scheme, the two DL subframes without UL submaps suffer from a great subchannel waste.

Also in case of scheduling for persistent control or for VoIP, the use of submaps may be further decreased. Therefore, the allocation of a whole OFDMA symbol to a submap in each subframe may cause serious resource consumption.

Accordingly, the size of a submap is indicated to each MS so that RBs can be allocated appropriately in the scalable TDM scheme. That is, an RB type can be determined according to a submap size.

Figure 11:
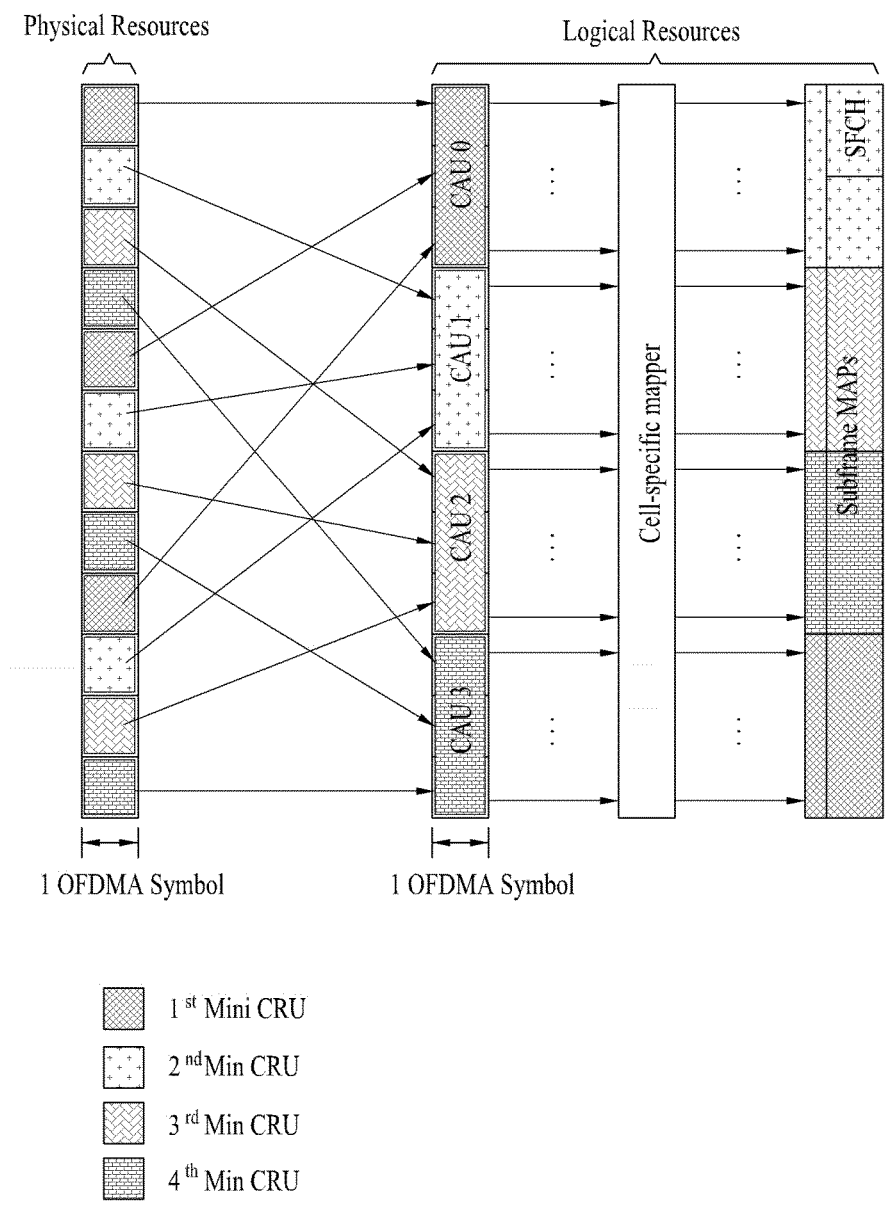
FIG. 11 illustrates an exemplary method for allocating resources to a TDM control channel area in a subframe.

FIG. 11 illustrates an exemplary method for allocating resources to a TDM control channel area in a subframe.

A basic physical control RU to be allocated to a TDM control channel is defined as a mini Control Resource Unit (CRU). A CRU is one type of RU, which is an allocation unit for a control channel. A mini CRU is composed of 18 successive subcarriers in frequency. One CAU can be formed with one or more mini CRUs.

A CAU is a subchannelized basic unit. To achieve diversity gain, the CAU can be composed of one or more mini CRUs distributed across a total frequency band. The number of CAUs and the size of each CAU depend on a system bandwidth or a cell type.

Mini CRUs of physical resources can be allocated equidistantly in frequency. For N CAUs in one OFDMA symbol, the relationship between the positions of physical resources allocated along the frequency axis, namely mini CRUs and the numbers of logical resources, CAUs is expressed as $$\text{number of allocated CAU} = \text{mini CRU number} \bmod N \quad \text{[Equation 1]}$$

If N=4 as illustrated in FIG. 11, mini CRUs successive in frequency can be allocated to CAUs in the same order of (1, 2, 3, 4), (1, 2, 3, 4), ..., (1, 2, 3, 4).

Logically resource-allocated CAUs are used without any further processing or after mapping. In the latter case, the logical CAUs are configured newly. An SFCH and a subframe map (or a submap) can be allocated to the newly configured logical resources. Apparently, the SFCH and the submap can be allocated to the logical CAUs without mapping.

The SFCH resides at the start of logical resources. Because all MSs should receive the SFCH with very high reliability, it is preferred that the SFCH is allocated in the manner that decreases the influence of interference from neighbor cells. The number of CAUs is determined according to the amount of resources required for a control channel. The remaining CAUs in an OFDMA symbol are allocated to data bursts or kept reserved to minimize intra-cell interference.

Referring to FIG. 11 again, logically allocated CAUs can be mapped in various manners by a cell-specific mapper. To increase frequency diversity gain, many particular mapping methods can be adopted. Also to minimize interference with the SFCH, each cell preferably uses a cell-specific structure.

Figure 12:
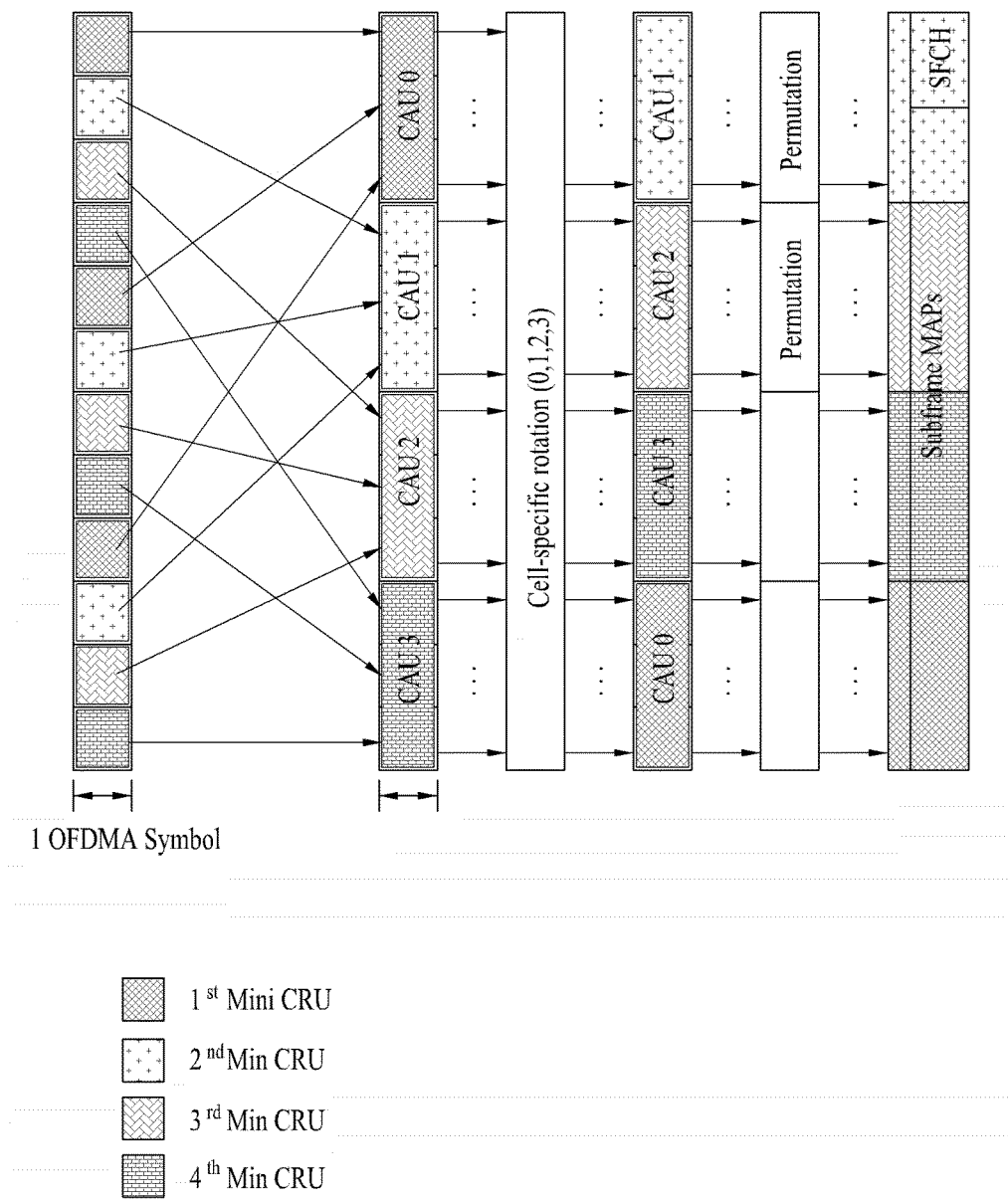
FIG. 12 illustrates an exemplary cell-specific mapper illustrated in FIG. 11.

FIG. 12 illustrates an example of the cell-specific mapper illustrated in FIG. 11.

FIG. 12 describes a method for allocating mini RUs allocated to physical subchannels to logical channels. Mini RUs can be allocated to control channels, taking into account diversity gain and frequency selectivity gain.

The cell-specific mapper includes a cell-specific rotation part and permutation parts applied to respective CAUs. The sequence of four CAUs is permuted in the cell-specific rotation part. If the cell-specific rotation part uses a rotation value of 0, the sequence of the four CAUs is not changed and thus the order of CAU 0, CAU 1, CAU 3, CAU 4 is kept. If the rotation value is 1, the sequence of the CAUs is changed to CAU 1, CAU 2, CAU 3, and CAU 0.

In the illustrated case of FIG. 12, the rotation value is 1. Every call can use a different rotation value. In this case, the SFCH is at a different position in each cell. After the cell-specific rotation, each CAU can be subject to permutation on a subcarrier basis. A final logical channel resulting from the permutation is so configured as to be distributed across a frequency area to achieve frequency diversity. Preferably, the permutation is specific to each cell. That is, the permutation can result in a particular logical channel of a cell having a different channel structure from that of a neighbor cell.

When an MS has excellent reception performance in a certain frequency band, the permutation may not be performed on CAUs in order to keep the same frequency band allocated to the MS. In this case, a logical channel is composed of subcarriers successive in frequency.

In FIG. 12, CAU 1 and CAU 2 are permuted, while CAU 3 and CAU 0 are not permuted. The BS can determine whether to permute each CAU according to channel status and transmit the determination results to each MS on a BCH or by an SFCH. Considering the SFCH is intended for all MSs, the first CAU is preferably permuted.

For efficient channel allocation, permuted CAUs and non-permuted CAUs are preferably successive. It can be contemplated that a reference point is defined and CAUs before the reference point are permuted, while CAUs following the reference point are not permuted.

Referring to FIG. 12 again, the BS can avoid permutation for predetermined CAUs to localize mini RUs on a CAU basis. The BS can allocate a subframe control channel to a localized CAU in units of 18 (subcarriers)×1(symbol) mini RUs.

The SFCH carries subframe configuration information and it can be applied to diversity resources. Therefore, the cell of each BS can use a first generated CAU as diversity resources by permutation and the other CAUs as distributed or localized resources depending on situations.

The BS can transmit CAU allocation information to the MS by an SFCH or a superframe header (or a supermap). The BS can represent the CAU allocation information by as many bits as the number of CAUs. For example, when one OFDMA symbol includes 12 mini RUs and three mini RUs form a CAU, four CAUs can be allocated to the OFDMA symbol. In this case, if the BS intends to use the last two CAUs as localized, it sets control bits in the SFCH or the superframe header (preferably a BCH) to '0b0011'. This means that two CAUs, CAU 0 and CAU 3 are allocated as localized and the other two CAUs, CAU 1 and CAU 2 are allocated as distributed.

The CAU configuration illustrated in FIG. 12 can facilitate application of beamforming, Space Frequency Block Coding (SFBC), or dedicated pilots to a localized control channel.

<Hybrid TDM/FDM>

Figure 13:
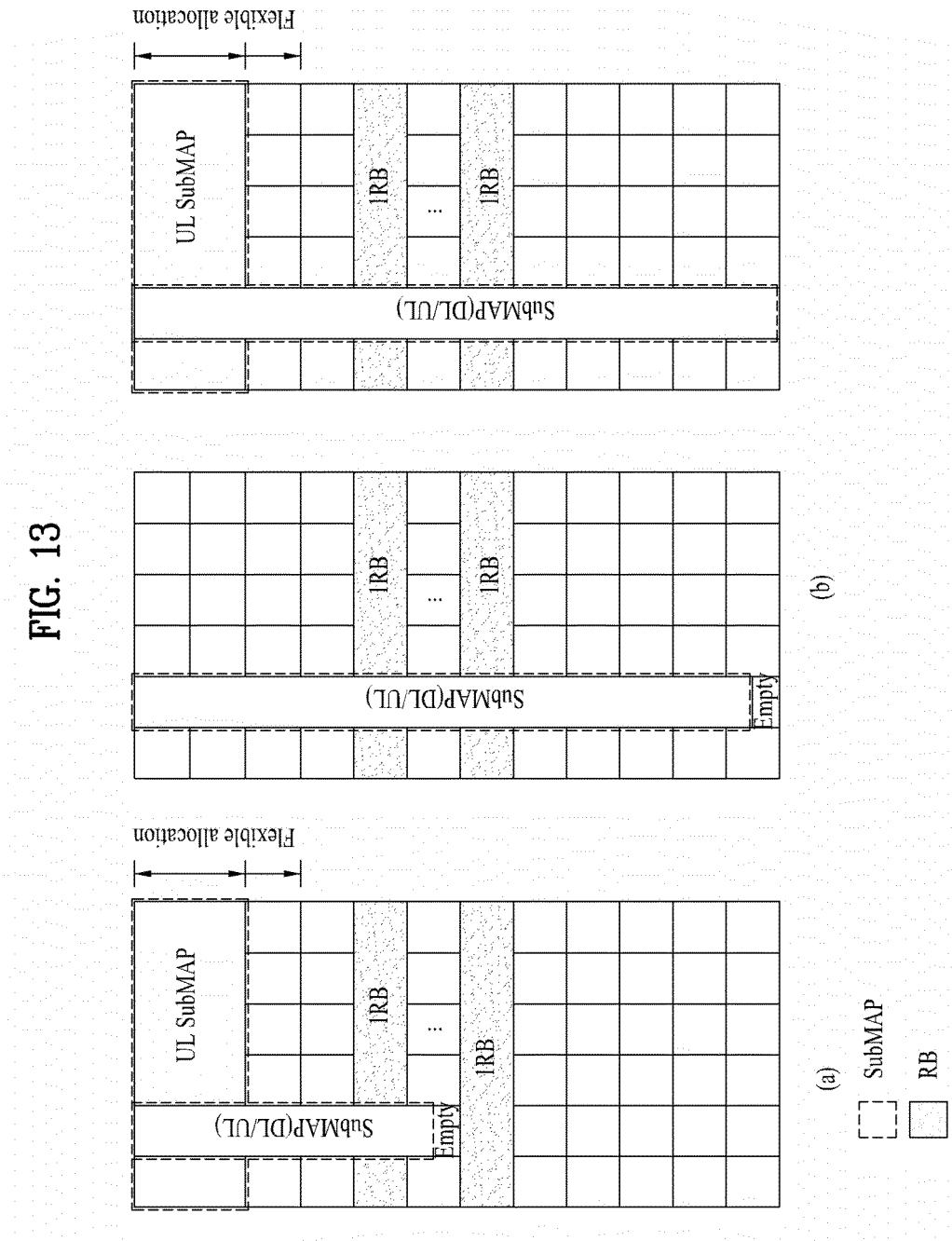
FIG. 13 illustrates a method for allocating a submap in a subframe in a hybrid TDM/FDM scheme according to another exemplary embodiment of the present invention.

FIG. 13 illustrates a method for allocating a submap in a subframe in a hybrid TDM/FDM scheme according to another exemplary embodiment of the present invention.

The hybrid TDM/FDM scheme can be applied when a submap is allocated asymmetrically in a subframe. A DL submap and a UL submap may have different requirements in timing. For instance, because the DL submap includes scheduling information about a DL control channel in the subframe, it should be completely decoded before all OFDMA symbols of the subframe are received. Therefore, the DL submap is preferably positioned at a front part of the subframe. On the other hand, because the UL submap is spaced from a UL subframe by at least two subframes, the position of the UL submap does not cause a decoding delay.

Accordingly, the DL submap and the UL submap can be allocated separately in the subframe. First, the DL submap is allocated to a fixed area of a particular OFDMA symbol in TDM. If the particular OFDMA symbol is not sufficient for the DL submap, a next OFDMA symbol can be added to allocate the remaining DL submap.

If there still remains a subchannel area in the OFDMA symbol after the allocation of the DL submap, the UL submap can be allocated to the remaining subchannel area. The remaining UL submap can be allocated to a specific RU in FDM.

In FIG. 13, although a submap can be allocated to a first OFDMA symbol of a subframe, it can be allocated variably to any other symbol. Yet, considering decoding delay, the submap is preferably allocated within first to third symbols.

FIG. 13(*a*) illustrates a method for allocating a submap in a subframe in the case where the size of a DL submap is less than a half of a symbol and the total size of a submap is less than a symbol. The BS can allocate the DL submap first in TDM and then a UL submap to a specific RB in FDM. Referring to FIG. 13(*a*), a DL submap occupies six subchannels and a UL map is allocated to RBs each having 5 OFDM symbols in a subframe. The remaining space resulting from the submap allocation is available for measuring interference from other BSs or other MSs.

FIG. 13(*b*) illustrates a method for allocating a submap in a subframe in the case where the size of a DL submap is larger than a half of a symbol and the total size of a submap is less than a symbol. In FIG. 13(*b*), the BS can allocate the DL submap first in TDM and then a UL submap to the remaining space in FDM.

FIG. 13(*c*) illustrates a method for allocating a submap in a subframe in the case where the total size of a submap is larger than one symbol. This submap allocation method is similar to that illustrated in FIG. 13(*a*) or 13(*b*). For instance, the DL map is allocated to a specific symbol in TDM and then a UL map is allocated to the remaining area of the symbol. If the symbol to which the DL submap has been allocated is not available or is not sufficient for the UL submap, the UL submap can be allocated to RBs each having 5 OFDMA symbols in FDM.

In FIG. 13, a fixed subchannel size can be used for a DL submap. Preferably, six subchannels are allocated to the DL submap. In this case, part of a frequency area is selected as a control channel. That is, the BS can form a distributed subchannel by selecting odd-numbered or even-numbered RUs from among physical RUs. If the total resource requirement of the submap exceeds one symbol, some information of the submap can be allocated to a symbol in TDM and the remaining submap information can be allocated using additional RUs in FDM.

The submap allocation methods illustrated in FIG. 13 are efficient in resource allocation, when the BS configures a control channel using distributed subchannels having subcarriers distributed across the total frequency band and configures a data channel using localized subchannels.

The hybrid TDM/FDM scheme described with reference to FIG. 13 is summarized in brief as follows.

An OFDMA symbol includes 12 subchannels and a submap can be allocated in units of six subchannels in one OFDMA symbol. The submap can also be allocated in units of CAUs described with reference to FIGS. 10, 11 and 12.

If the size of the DL submap is less than or equal to 12 channels (i.e. the total frequency area of one OFDMA symbol), the DL submap is first allocated to six subchannels in TDM. If the DL submap is larger than six subchannels, another six subchannels can be allocated to the DL submap.

The UL submap is then allocated to the remaining subchannels of the OFDMA symbol. If the remaining subchannels are not sufficient for the UL submap, RUs are added for the FDM-allocation of the UL submap.

If the DL submap exceeds one OFDMA symbol (12 subchannels) in size, it is allocated first to 12 subchannels, always in TDM. The remaining subchannels of the OFDMA symbol are allocated to the UL submap. If the remaining subchannels are not sufficient for the UL submap, additional RBs can be used for the UL submap.

Figure 14:
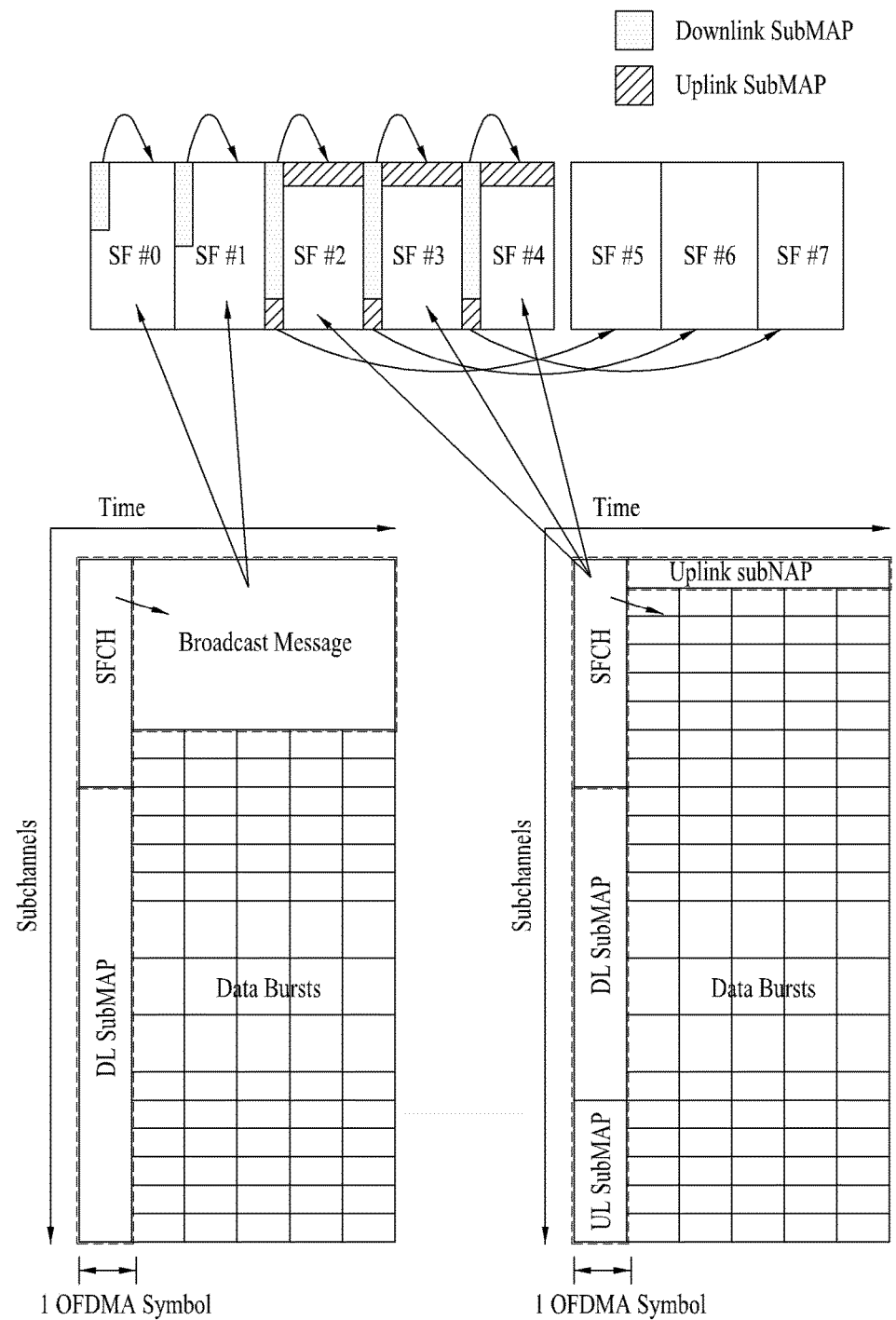
FIG. 14 illustrates a specific method for allocating a submap in a subframe in the hybrid TDM/FDM scheme according to another exemplary embodiment of the present invention.

FIG. 14 illustrates a specific method for allocating a submap in a subframe in the hybrid TDM/FDM scheme according to another exemplary embodiment of the present invention.

An SFCH resides at the start of a subframe. The SFCH is transmitted all over a cell and it is fixed in contents and size. The SFCH may include various pieces of information, for example, resource allocation information about a BCH. The start position and MCS level of the BCH are defined by a standard and the BS simply notifies the size of resources allocated to the BCH. Notably, the BCH is not always present and thus transmission of information about the BCH all the time on the SFCH leads to unnecessary resource consumption.

In this context, the SFCH is used basically as a TDM submap in the hybrid TDM/FDM scheme. Yet, only if the total length of the submap exceeds one OFDMA symbol, a UL submap can be allocated in FDM. The FDM submap is not regularly allocated and its length is variable.

Especially when the ratio in number between DL subframes and UL subframes is asymmetrical, for example, 5:3 or 6:2, some DL subframes may have UL submaps, and the other DL subframes may not.

For a DL subframe without a UL submap, the BS allocates resources to the DL subframe, for transmitting a broadcast message, a paging message, or a Multicast Broadcast Service (MBS) message. The BS can transmit resource allocation information about the message to the MS by the SFCH.

For a DL subframe carrying a UL submap, the BS may not allocate a transmission area for a broadcast message or the like in the DL subframe. The BS can transmit frequency resource allocation information about the UL submap to the MS by the SFCH.

Referring to FIG. 14, a frame includes five DL subframes and three UL subframes. In FIG. 14, it is assumed that first and second subframes, SF #0 and SF #1 carry only DL submaps, and third, fourth, and fifth DL subframes, SF #2, SF #3 and SF #4 each deliver both a DL submap and a UL submap. Also, FIG. 14 is based on the assumption of the hybrid TDM/FDM scheme, like FIG. 13.

For each DL subframe having only a DL submap, the BS allocates an SFCH and the DL submap in TDM to the first OFDMA symbol of the DL subframe. In addition, the BS can allocate a broadcast message and data bursts in FDM to the remaining OFDMA symbols.

For each DL subframe having both a DL submap and a UL submap, the BS first allocates an SFCH and the DL submap in TDM to the first OFDMA symbol of the DL subframe and then the UL submap to the remaining area of the OFDMA symbol. If the remaining OFDMA symbol area is not sufficient for the UL submap, the remaining UL submap is allocated in FDM.

Table 2 below compares the general TDM scheme, the general FDM scheme, the scalable TDM scheme, and the hybrid TDM/FDM scheme in terms of the amount of allocated resources.

TABLE 2

|  | TDM | FDM | Scalable TDM | Hybrid TDM/FDM |
|---|---|---|---|---|
| Minimum allocation unit | 16.667% (1 symbol) | 2.08% (1 RU or subchannel) | 0.34% (1 RU/6 symbols) | 8.33% (basic) + 1.7% (0.5 symbol + 1 RU) |
| Amount of allocated Resources when the requirement of control channels is 10% of the total resources | 16.667% (1 symbol) | 10.4% (5 subchannels) | 10.2% (30 units) | 20.06% (1 symbol + 2 RUs) |
| Resource waste | 6.667% | 0.4% | 0.2% | 0.06% |
| Amount of allocated Resources when the requirement of control channels is 15% of the total resources | 16.667% (1 symbol) | 16.64% (5 subchannels) | 15.3% (30 units) | 15.133% (1 symbol + 2 RUs) |
| Resource waste | 1.667% | 1.64% | 0.3% | 0.13% |
| Amount of allocated Resources when the requirement of control channels is 20% of the total resources | 33.333% (2 symbols) | 20.8% (10 subchannels) | 20.06% (59 units) | 20.06% (1 symbol + 2 RUs) |
| Resource waste | 13.3333% | 0.8% | 0.06% | 0.06% |

In Table 2, the four resource allocation schemes are compared with respect to a subframe having 6 OFDMA symbols and 48 RUs. The resolution of the occupation ratio of control channels and the amount of resources waste are noted for each resource allocation scheme from Table 2. TDM brings about a great resource waste, whereas the scalable TDM and the hybrid TDM/FDM are lowest in resource waste.

Figure 15:
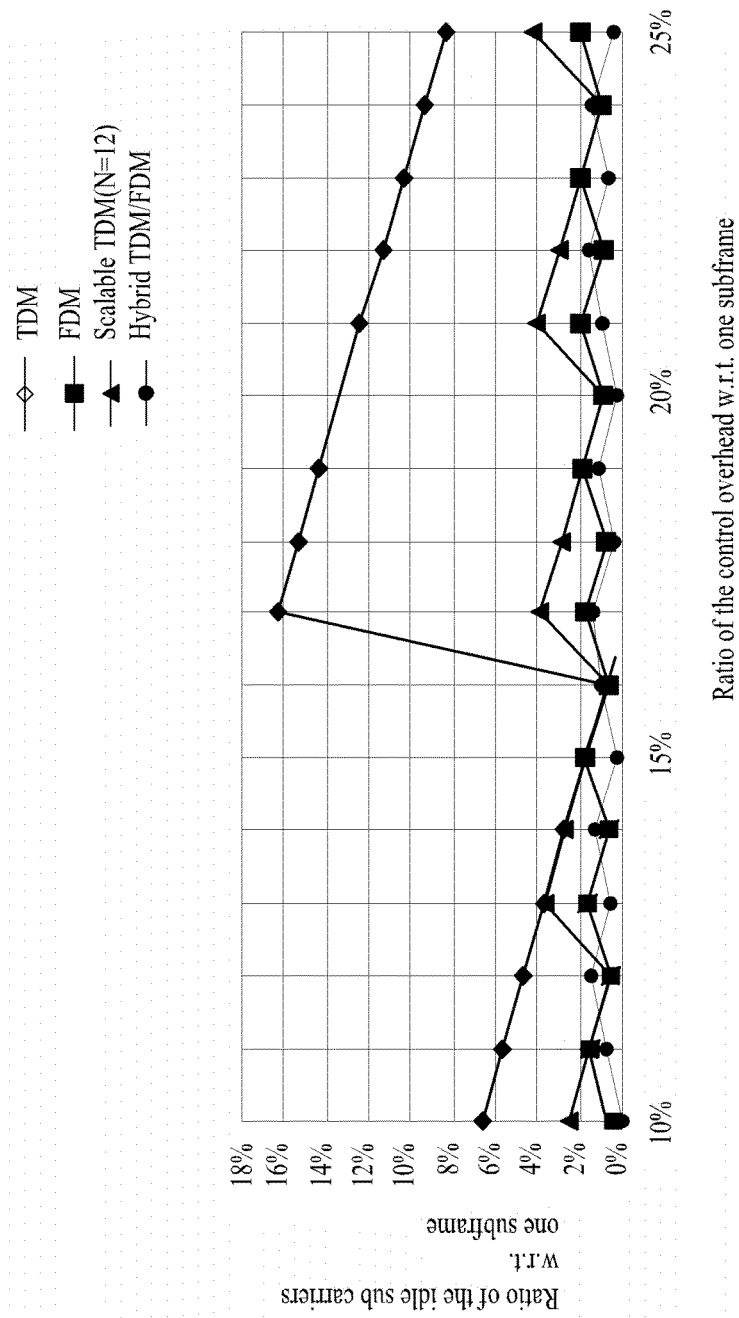
FIG. 15 is a graph comparing a TDM scheme, an FDM scheme, a scalable TDM scheme, and the hybrid TDM/FDM scheme in terms of resource consumption.

FIG. 15 is a graph comparing a TDM scheme, an FDM scheme, a scalable TDM scheme, and the hybrid TDM/FDM scheme in terms of resource consumption.

Referring to FIG. 15, the horizontal axis represents the overhead ratio of control channels to a subframe and the vertical axis represents the ratio of idle subcarriers to a subframe. As noted from the graph, the hybrid TDM/FDM scheme and the scalable TDM scheme perform well. Although the FDM scheme outperforms the scalable TDM scheme in terms of overhead, the latter is more efficient than the former, when diversity is considered. That is, a certain degree of trade-off is needed between the scalable TDM scheme and the FDM scheme.

Figure 16:
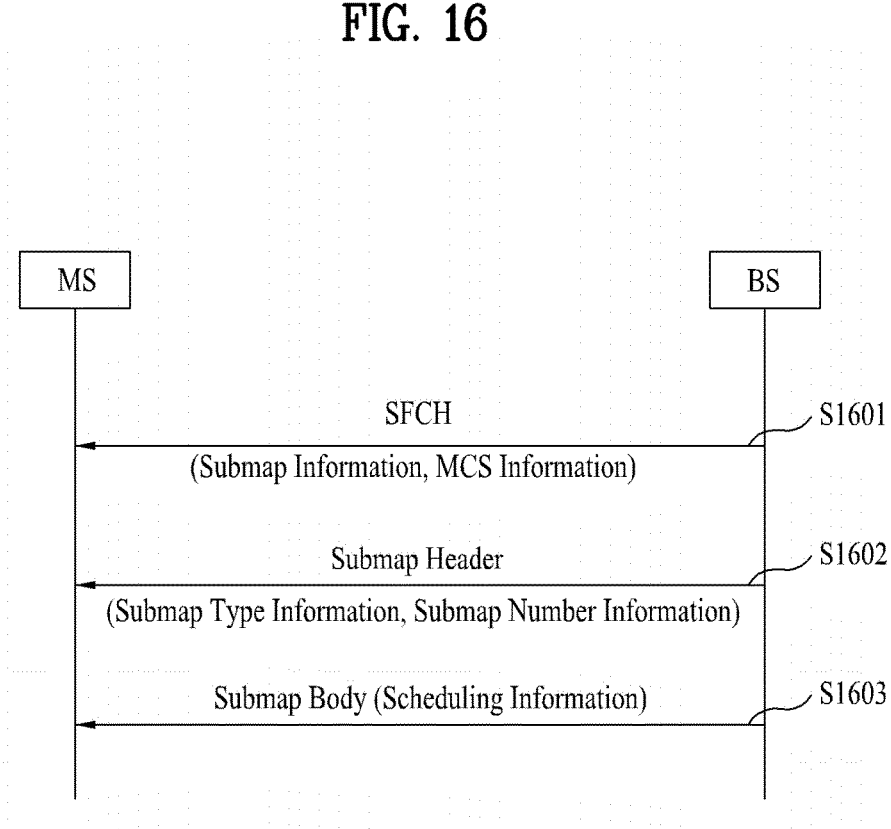
FIG. 16 illustrates a method for allocating a submap according to a further exemplary embodiment of the present invention.

FIG. 16 illustrates a method for allocating a submap according to a further exemplary embodiment of the present invention.

Referring to FIG. 16, the BS transmits an SFCH including subframe information to the MS in step S1601. The SFCH may include at least one of the subframe information, submap information, and message resource allocation information. Optionally, the SFCH may further include MCS information about a next submap header. One SFCH can be allocated per subframe.

Table 3 below illustrates an exemplary SFCH format to which exemplary embodiments of the present invention can be applied.

TABLE 3

| Type | Information | items | Number of bits |
|---|---|---|---|
| SFCH | Subframe information | Information about distributions of distributed RUs and localized RUs | X bits |
| | | subframe grouping information | X bits |
| | | Information about the number of BS antennas (group ACK/NACK information) | 1 or 2 bits |
| | Submap information (sizes of areas occupied by submaps | | X bits |
| | Resource allocation information about message (e.g. broadcast message, etc.) | | X bits |
| | (MCS information about next submap header) | | (1 to 3 bits) |

Referring to Table 3, the subframe information may describe the distributions of distributed RUs and localized RUs, subframe grouping, and the number of BS antennas. Optionally, the subframe information may further include group ACK/NACK information.

The BS can notify the MS of the RU distribution information by transmitting an index indicating a predefined RU distribution, a bitmap indicating the positions of distributed RUs, or the distribution ratio between distributed RUs and localized RUs. The subframe grouping information indicates the number of grouped subframes when a plurality of subframes are controlled in a group.

The submap information describes the sizes of areas occupied by submaps. The submap information indicates the number of CAUs in case of the scalable TDM scheme and the number or positions of RUs for a UL submap (for example, information about RUs used for the UL submap) in case of the hybrid TDM/FDM scheme.

The message resource allocation information is used to allocate resources to a broadcast message and a data message. If an additional submap is allocated for messages requiring a lowest coding rate, overhead increases. Therefore, the broadcast message and the lowest coding rate-requiring messages are encoded by joint coding. Herein, the start of a burst to convey the broadcast message is fixed and only information about the size of the burst can be included in the SFCH. This is called broadcast message resource allocation information, Message resources can be allocated by indicating the type and number of used RUs or the size of a burst of which the start position is fixed, such as transmission of burst size information in the SFCH. Herein, the size of an RU can be fixed.

MCS information included in the SFCH is about the following submap. The MCS information about a next submap header can indicate the presence or absence of the following submap and MCS information about the submap header of the next submap.

MCS information included in the submap header is about a submap body. The MCS information of the submap header is 1 or 2 bits to represent up to 2 to 4 types. MCS information about the last submap can be known because the SFCH indicates the areas of total allocated submaps.

Because every MS should be able to receive the SFCH, the BS transmits the SFCH using a lowest MCS level. The lowest MCS level of a specific cell may change according to the situation of the cell. For instance, in a fine indoor cell like a femto cell, an MS has excellent reception performance, compared to a general micro cell. Accordingly, even though the BS transmits a message encoded at a higher MCS level than in the micro cell, every MS can receive the message in the femto cell.

The SFCH can be encoded at a constant MCS level, like an FCH, or at a variable MCS level according to a channel environment or a cell environment. The BS can notify the MS of the MCS level of the SFCH by a preamble (or a synchronization channel) of a superframe header or by a supermap.

In the former case, the MCS level of the SFCH is kept the same during a superframe. Upon acquisition of the MCS level of the SFCH from the superframe header, the MS can decode the SFCH using the MCS level. The MCS level of the SFCH is lowest in the superframe.

The BS can transmit a superframe header (preferably, a BCH) including MCS information about the SFCH. The superframe header may include information about an MCS set used for subframes, instead of the MCS information. In this case, the MS can decode the SFCH at the lowest of MCS levels of the MCS level set. In the case where the BS indicates a particular MCS level selected from the MCS set to the MS, the MS can decode the SFCH using the MCS level.

Referring to FIG. 16 again, the BS can transmit a submap header including submap type information and submap number information to the MS in step S1602.

Table 4 below illustrates an exemplary submap header format to which exemplary embodiments of the present invention can be applied.

TABLE 4

| Type | Information | Items | Number of bits |
|---|---|---|---|
| Submap header | Submap number information | Number of first-type submaps | X bits |
| | | number of second-type submaps | X bits |
| | | ... | X bits |
| | | number of N-type submaps | X bits |
| | MCS of next submap header | | 1 to 3 bits |

Table 4 describes information included in the submap header transmitted to the MS in step S1602. A plurality of submap headers may exist in a submap on the MCS levels of subframes.

The submap number information may specify submap types and the numbers of submaps for each of the submap types. The MCS of next submap header has the same meaning as the MCS information about next submap header listed in Table 3.

In step S1602, the submap header is used to reduce excess blind decoding. Specifically, the BS transmits information about the types and numbers of submaps encoded at the same MCS level to the MS, to thereby decrease excess blind decoding of the MS.

The MS can acquire the MCS levels of submaps from the MCS information included in the submap header. The submap header may include information about the numbers of various types of submaps with different sizes. The number of bits of the submap header may vary with the types and total number of submaps. The submap header may have various MCS levels according to the reception environment of the MS. If a DL submap and a UL submap are positioned separately as in the hybrid TDM/FDM scheme, the DL submap and UL submap are indicated as different types, even though they have the same size.

Referring to FIG. 16 again, the BS can transmit a submap body to the MS in step S1603.

The submap body includes scheduling information about a DL subframe. The submap body may further include scheduling information about a UL subframe, which is optional.

Figure 17:
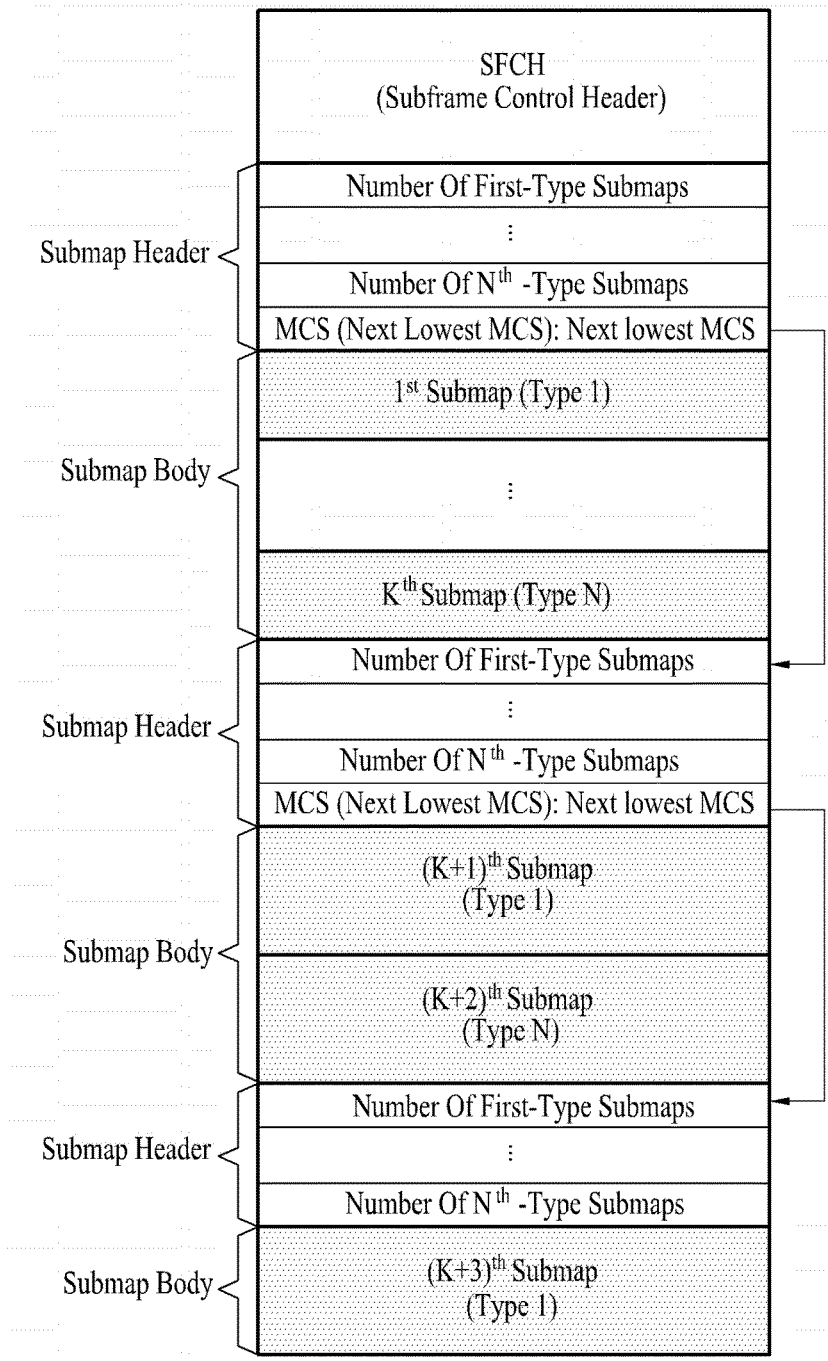
FIG. 17 illustrates an exemplary submap structure to which exemplary embodiments of the present invention can be applied.

FIG. 17 illustrates an exemplary submap structure to which exemplary embodiments of the present invention can be applied.

Referring to FIG. 17, the submap structure includes an SFCH, one or more submap headers, and one or more submap bodies. Information included in the SFCH is listed in Table 3 and information included in the submap headers is listed in Table 4.

Submaps can be classified into a plurality of types according to their sizes and MCS levels. The MS can decode a submap by acquiring information about the size and MCS level of the submap.

In FIG. 17, submaps are sequentially arranged in an ascending order of coding rates of MCS levels. A plurality of dedicated submaps may exist for a particular MS, but they have the same MCS level. For instance, if the MS is supposed to use a submap of a predetermined MCS level, it cannot decode a submap encoded at a different MCS level.

Referring to FIG. 17, an SFCH resides at the start of a submap. The SFCH is a channel conveying basic information about a subframe and every subframe starts with an SFCH. The SFCH may include many pieces of information, for example, the information listed in Table 3.

The BS can transmit a submap header including information about the types of submaps encoded at the same MCS levels and the number of submaps of each type. The MS can reduce excess blind decoding using the information included in the submap header. The submap header may further include MCS information about the next submap header. The submap header may include the number of submaps for each type with a different size.

For two types of submaps having 30 bits and 40 bits, respectively before encoding, the BS transmits n 30-bit submaps and m 40-bit submaps. Assuming that 10 to 16 submaps exist per subframe in a 10-MHz channel in an IEEE 802.16m wireless access system, about 3 or 4 bits are required to represent one type. Therefore, for two submap types, 6 bits (3 bits×2) are needed for the submap header. The number of bits to represent submap types may change according to the types and the total number of submaps. It can be further contemplated as another exemplary embodiment of the present invention that the submap header has a plurality of MCS levels according to the reception environment of the MS.

If a DL submap and a UL submap are positioned separately as in the hybrid TDM/FDM scheme, the DL submap and UL submap are indicated as different types, even though they have the same size.

In FIG. 17, a submap (or a submap body) is a control channel that carries scheduling information about a control channel or a data channel allocated to the MS. The submap body can be encoded at a different MCS level according to the reception environment of the MS. A Cyclic Redundancy Code (CRC) is added to each submap body. An initial value of the CRC is an Identifier (ID) of the MS (e.g. Radio Network Temporary ID (RNTI) in 3GPP LTE, UE ID in High Speed Downlink Packet Access (HSDPA), and CID in Worldwide Interoperability for Microwave Access (WIMAX)) as in a 3GPP LTE PDCCH or an HSDPA HS-SCCH. Therefore, the MS decodes the CRC of the submap and can determine whether the submap has been received accurately by comparing the decoded value with its unique number. That is, the MS can determine using the CRC whether the received submap is destined for the MS. Notably, since a broadcast message or the like has a unique number, it can be considered as a common control channel.

Table 5 below lists DCI types in 3GPP LTE.

TABLE 5

| DCI format | Types | Items | |
|---|---|---|---|
| 0 | For UL-SCH | Flag for format 0/format 1A differentiation | 1 |
| | | Hopping flag | 1 |
| | | Resource block assignment | 13 |
| | | Transport format | 5 |
| | | New Data Indicator | 1 |
| | | TPC command for scheduled PUSCH | 2 |
| | | Cyclic shift for DM RS | 3 |
| | | CQI request | 1 |
| | | RNTI/CRC | 16 |
| 1 | For DL SIMO channel | Distributed transmission flag | 1 |
| | | Resource allocation header | 1 |
| | | Resource block assignment | 25 |
| | | MCS | 5 |
| | | HARQ process number | 3 |
| | | New Data Indicator | 1 |
| | | Redundancy Version | 2 |
| | | TPC command for PUCCH and persistent PUSCH | 2 |
| | | RNTI/CRC | 16 |
| 1A | For DL SIMO (Compact) | Flag for format 0/format 1A differentiation | 1 |
| | | Distributed transmission flag | 1 |
| | | Resource block assignment | 13 |
| | | Transport format | 5 |
| | | HARQ process number | 3 |
| | | Redundancy Version | 2 |
| | | TPC command for PUCCH and persistent PUSCH | 2 |
| | | RNTI/CRC | 16 |
| 2 | For DL MIMO | Distributed transmission flag | 1 |
| | | Resource allocation header | 1 |
| | | Resource block assignment | 25 |
| | | TPC command for PUCCH and persistent | 2 |
| | | Number of layers | 2 |
| | | For the first codeword: | |
| | | Transport format | 5 |
| | | HARQ process number | 3 |
| | | New Data Indicator | 1 |
| | | Redundancy Version | 2 |
| | | For the second codeword: | |
| | | Transport format | 5 |
| | | HARQ swap flag | 1 |
| | | New Data Indicator | 1 |
| | | Redundancy Version | 2 |
| | | Precoding Information | 4 |
| | | Precoding Confirmation | 14 |
| | | RNTI/CRC | 16 |
| 3 | For UL TPC (2-bit TPC) | TPC command for user 1, user 2, . . . , user N | |
| 3A | For UL TPC (1-bit TPC) | TPC command for user 1, user 2, . . . , user 2N | |

In the illustrated case of FIG. 17, total submap types can be the five submap types as listed in Table 5 (DCI format=0, 1, 1A, 2, 3 and 3A).

Table 6 below lists submap types to which another exemplary embodiment of the present invention can be applied.

TABLE 6

| | DL multicast | DL First | DL Retran | DL Grant | DL TPC |
|---|---|---|---|---|---|
| MAP Type | 0 (distinguished by CID) | | 1-2(1) | 0-1 | 0 (distinguished by CID) |
| Resource Assignment | 9-13 RU Mapping(11) Duration(0-2) | UL/DL(0-1) + 1st/Re(1) 11-14 (11(Mapping) + 1(Duration)) Type Indicator (DL or UL: 0-1 bit), RU Mapping(11), Duration(0-2) | | UL/DL(0-1) | 2-4 Timer(2-4) Persistent(??) |
| MIMO Info | 0-1 CDD or SFBC(1) or fixed | 5-7(5) CL/OL(1), Rank(2), N_TxAnt(01), Co-MIMO Ind(0-1), Precoding Indi(2) | | 4-5(4) CL/OL(0-1), Rank(1), PMI(3) | 0 |
| MCS | 0-4 MCS(limited) | 6-10(6) Composite MCS(6-9) or Payload Size Index(6-8) + Mod(2) | 2-6(2) Modulation (2) | 5-7(6) Composite MCS(6-7) Payload Size Index (4-6) Mode(1) | 0 |
| HARQ | 0-2 Multicast HARQ?? | 6-9(6) ND + Seq_No (1-3), N_Process (3), Multiple CRC(1-2) | 7-12(8) Seq_No(2), N_Process (3), M CRC(1-2), Mode(1-5) | 6-11(6) Seq_No(2), N_Process(2), Multiple CRC(1-2), Mode(1-5) | 0 |
| TPC/TA | 0 | 1-5(1) TPC(1-2), DL Power Boosting (0-3) | | | 1-2(1) TPC(1-2) |
| CRC/CID | 16 | 16 | | 16 | |
| Total | 24-35(33) | 46-63 (48) | 43-62 (45) | 43-56 (45) | 3-6(matched to 36 by summation) |

Figure 18:
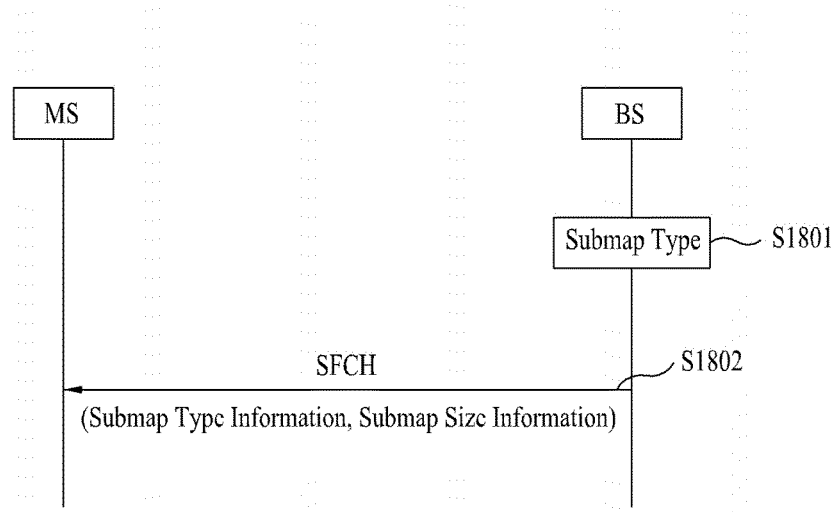
FIG. 18 illustrates a method for allocating a submap according to still another exemplary embodiment of the present invention.

FIG. 18 illustrates a method for allocating a submap according to still another exemplary embodiment of the present invention.

In still another exemplary embodiment of the present invention, the BS can set submap types, taking into account the MCS levels and sizes of submaps in step S1801.

If there are four MCS levels and two submap sizes for the submaps in step S1801, the total number of submap types is 8 (4 MCS levels×2 sizes). When submap types are preset, the BS can notify the MS of MCS information and submap information by an SFCH, which obviates the need for transmitting a submap header in every submap body by the BS.

In step S1802, the BS can allocate submaps and control channels by transmitting an SFCH including information about predetermined submap types and information about submap sizes.

Table 7 illustrates an exemplary SFCH format available in steps S1802.

TABLE 7

| Type | Information | Items | Number of bits |
|---|---|---|---|
| SFCH (one SFCH per subframe) | Subframe information | Position information about distributed RUs | X bits |
| | | Subframe grouping information | X bits |
| | | Number of BS antennas | (1-2) bits |

TABLE 7-continued

| Type | Information | Items | Number of bits |
|---|---|---|---|
| | | Submap information (sizes of areas occupied by submaps) | X bits |
| | | Broadcast message resource allocation information | X bits |
| | | Number of submaps for each submap type (M = $\log_2$(maximum number of submaps available for one type) | M × number of types |

Table 7 describes subframe information included in the SFCH. There is one SFCH per subframe in FIG. 18. The subframe information may include position information about distributed RUs in the form of a bitmap, subframe grouping information, and information about the number of BS antennas. Also, the SFCH may include submap information (i.e. information about the sizes of areas occupied by submaps), message resource allocation information (i.e. resource allocation information about a broadcast message), and information about the number of submaps for each submap type.

In FIG. 18, the BS can preset submap type information. The MS can share the submap type information with the BS during initial access. Therefore, the BS can allocate submaps to the MS by transmitting the submap type information and the information about the number of submaps for each submap type in the SFCH.

Figure 19:
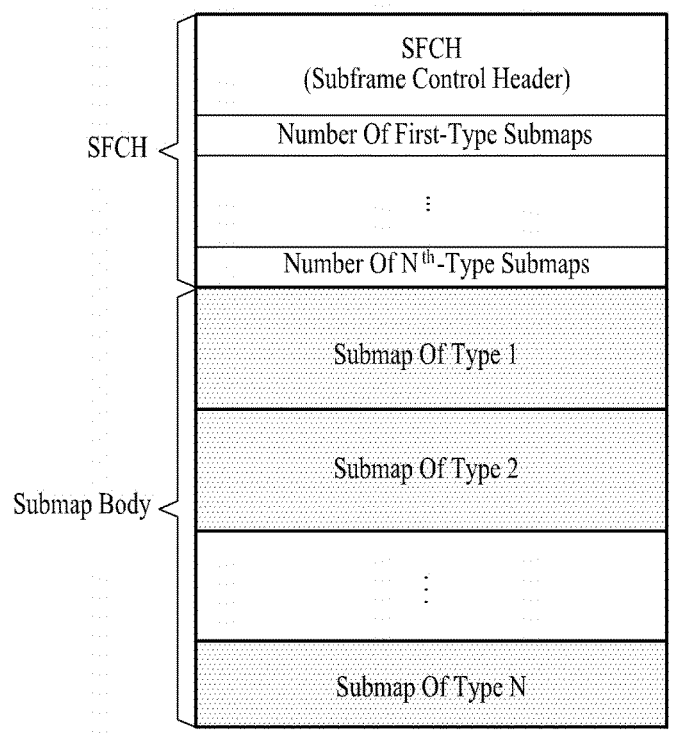
FIG. 19 illustrates an exemplary submap structure to which exemplary embodiments of the present invention can be applied.

FIG. 19 illustrates an exemplary submap structure to which exemplary embodiments of the present invention can be applied.

FIG. 19 illustrates a submap structure that the BS allocates to the MS in the method illustrated in FIG. 18. Referring to FIG. 19, an SFCH may reside in the first OFDMA symbol of a subframe. The SFCH may include the information listed in Table 7. That is, the SFCH may include information about the number of submaps for each submap type. Submap bodies are divided according to submap types.

Figure 20:
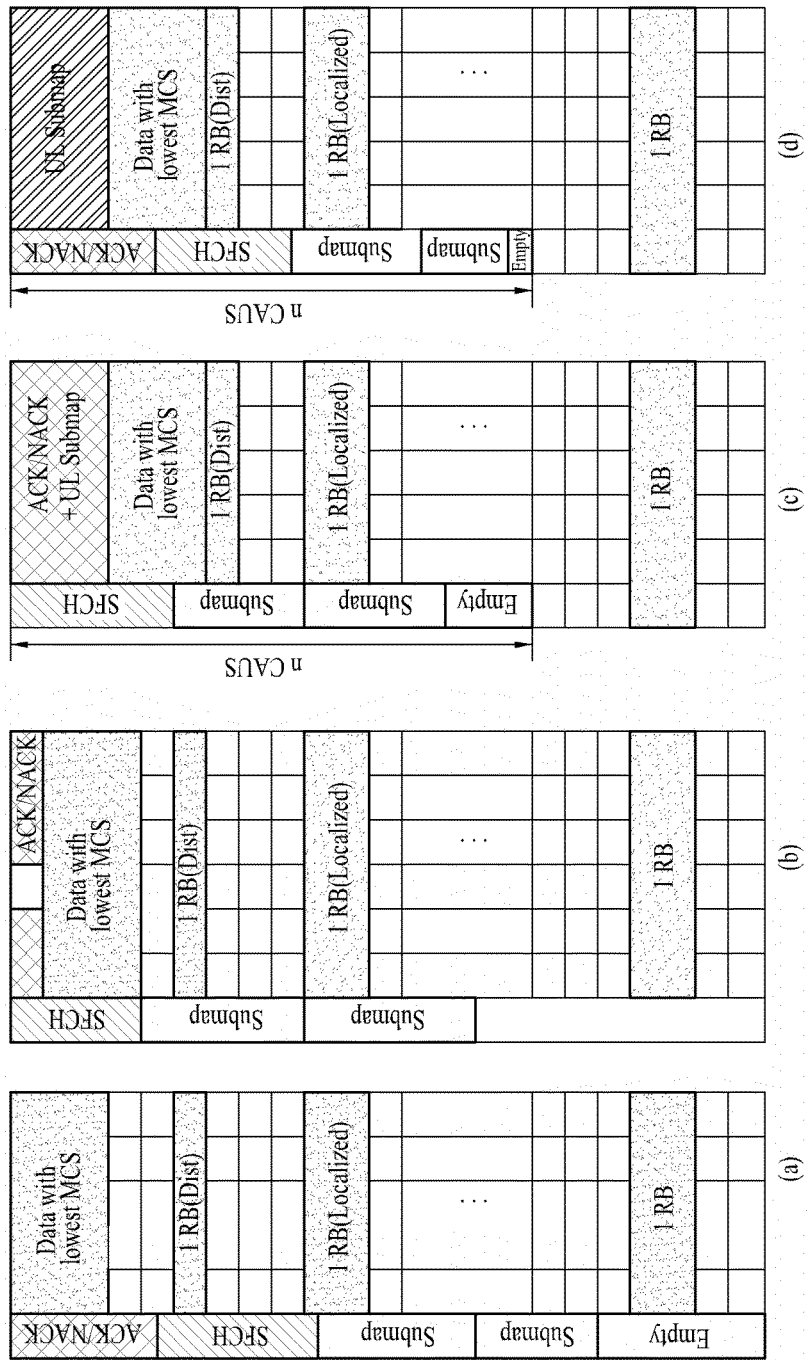
FIG. 20 illustrates exemplary subframe structures to which exemplary embodiments of the present invention can be applied.

FIG. 20 illustrates exemplary subframe structures to which exemplary embodiments of the present invention can be applied.

FIG. 20(a) illustrates a control channel structure when a submap is allocated in TDM. Referring to FIG. 20(a), the submap is allocated in TDM. An RU can be composed of 5 OFDMA symbols. An SFCH and an ACK/NACK channel as a control channel can be allocated to the remaining subchannels of an OFDMA symbol after a submap is allocated to the OFDMA symbol. If there still remains any subchannel in the OFDMA symbol after the allocation of the SFCH and the control channel, the subchannel is kept empty. The empty area of the OFDMA symbol to which the submap is allocated can be used to measure interference from other cells.

FIG. 20(b) illustrates an exemplary subframe structure when a submap is allocated in scalable TDM. The position of the submap may vary with a user requirement or a channel environment. In FIG. 20(b), an RU can be composed of 5 or 6 OFDMA symbols. An SFCH and the submap may be allocated to TDM subchannels using n CAUs.

FIG. 20(c) illustrates a subframe structure when a submap is allocated in hybrid TDM/FDM. The submap is allocated in units of a CAU. The BS can allocate an SFCH and a DL submap to an OFDMA symbol always in TDM and a UL submap to the remaining area of the OFDMA symbol. Also, the BS can keep the remaining subchannels as an empty area. The empty area can be used to measure interference from other cells.

In FIG. 20(c), the BS can allocate the UL submap in FDM, starting with the first subchannel. The BS may allocate an ACK/NACK channel in the area to which the UL submap is allocated. The BS can allocate data sequentially in an ascending order of MCS level after the allocation of the UL submap.

FIG. 20(d) illustrates another exemplary subframe structure when a submap is allocated in hybrid TDM/FDM. The BS allocates an SFCH and a DL submap to an OFDMA symbol in TDM. Also, the BS can allocate an ACK/NACK channel in the remaining area of the OFDMA symbol. The BS can allocate a UL submap to the first RU of subchannels in FDM.

A transmitter and a receiver for implementing the exemplary embodiments of the present invention illustrated in FIGS. 3 to 20 will be described below.

The MS may operate as a transmitter on the uplink and as a receiver on the downlink. The BS may operate as a receiver on the uplink and as a transmitter on the downlink. That is, the MS and the BS each can include a transmitter and a receiver for transmitting information or data. The transmitter and the receiver may include processors, modules, parts and/or means, in order to implement the exemplary embodiments of the present invention. Especially, the transmitter and the receiver may include a module (means) for encoding a message, a module for interpreting the encoded message, an antenna for transmitting and receiving a message, etc.

In accordance with exemplary embodiments of the present invention, the MS may include a low-power Radio Frequency/Intermediate Frequency (RF/IF) module. Also, the MS may include means, modules, or parts for performing control, MAC frame variable control according to service characteristics and a propagation environment, handover, authentication and encryption, packet modulation and demodulation for data transmission, high-speed packet channel coding, and real-time modem control, in order to implement the exemplary embodiments of the present invention.

The BS may transmit data received from an upper layer to the MS wirelessly or by cable. The BS may include a low-power RF/IF module. Also, the BS may include means, modules, or parts for performing control, OFDMA packet scheduling, TDD packet scheduling and channel multiplexing, MAC frame variable control according to service characteristics and a propagation environment, real-time high-speed traffic control, handover, authentication and encryption, packet modulation and demodulation for data transmission, high-speed packet channel coding, and real-time modem control, in order to implement the exemplary embodiments of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

MODE FOR INVENTION

Various embodiments have been described in the best mode for carrying out the invention.

INDUSTRIAL APPLICABILITY

The present invention is applicable to various wireless access systems, for example, 3GPP, 3GPP2 and/or IEEE 802.xx. The exemplary embodiments of the present invention are applicable to every technological field of applications of the various wireless access systems as well as the various wireless access systems.

The invention claimed is:

1. A method for allocating submaps in a wireless access system, the method performed by a base station and comprising:
configuring resource areas according to a size of the submap;
allocating a control header to the resource areas, the control header including subframe information, downlink submap allocation information, and uplink submap allocation information,
wherein the subframe information includes resource unit (RU) distribution information which is selected from a first to a third scheme, the first scheme indicating a distribution ratio between distributed RUs and localized RUs, the second scheme indicating a bitmap of positions of distributed RUs, and the third scheme indicating an index of a predefined RU distribution;
allocating a downlink submap and an uplink submap to the resource areas based on the control header; and
transmitting the control header of the downlink submap and the uplink submap,
wherein the downlink submap and the uplink submap are sequentially allocated to a first symbol column in the resource area configured by symbol columns and subchannel rows, and a remainder of the uplink submap is allocated to a first subchannel row when the whole of the uplink submap is not allocated to the first symbol column.

2. The method according to claim 1, wherein each of the resource areas is configured by control allocation units comprising predetermined resource units.

3. The method according to claim 2, wherein the predetermined resource units are distributed across a total frequency area of the subframe in a predetermined order.

4. The method according to claim 2, wherein the step of allocating further comprises:
rearranging one or more control allocation units included in the one or more resource areas in a predetermined order in a predetermined symbol; and
permuting a predetermined control allocation unit among the one or more control allocation units.

5. The method according to claim 4, wherein the step of rearranging comprises:
changing an allocation sequence of the one or more control allocation units using a predetermined rotation value.

6. The method according to claim 2, wherein the predetermined resource units included in the control allocation unit are located from one another by the number of the resource units in a total frequency area of the subframe.

7. The method according to claim 2, further comprising calculating a total amount of required resources for the downlink submap and the uplink submap in terms of the number of symbols each configured to predetermined subchannels,
wherein if the total amount of required resources for the downlink submap and the uplink submap is less than one symbol, the step of allocating is performed by allocating the control header and the downlink submap to a first control allocation unit in time division multiplexing.

8. The method according to claim 7, wherein the step of allocating further comprises:
allocating the control header and the downlink submap to the first control allocation unit and allocating the uplink submap to a remaining subchannel area of the first control allocation unit.

9. The method according to claim 8, wherein if the whole of the uplink submap is not allocated to the first control allocation unit, the uplink submap is allocated using a second control allocation unit additionally.

10. The method according to claim 1, wherein the uplink submap is allocated to a remaining area after the downlink submap is allocated.

11. The method according to claim 2, wherein the submap information includes information about a number of the control allocation units to which the downlink submap and the uplink submap are allocated.

12. The method according to claim 1, wherein the downlink submap and the uplink submap are sequentially allocated to the first symbol column in a time division multiplexing scheme, and the remainder of the uplink submap is allocated to the first subchannel row in a frequency division multiplexing scheme when the whole of the uplink submap is not allocated to the first symbol column.

13. The method according to claim 1, wherein the submap information includes a first MCS (Modulation and Coding Scheme) information indicating a first MCS of the downlink submap and a second MCS information indicating a second MCS of the uplink submap.

14. A method for receiving control channel information in a wireless access system, the method performed by a mobile station and comprising:
receiving a control header allocated to resource areas of a subframe, the control header including subframe information, downlink submap allocation information, and uplink submap allocation information,
wherein the subframe information includes resource unit (RU) distribution information which is selected from a first to a third scheme, the first scheme indicating distribution ratio between distributed RUs and localized RUs, the second scheme indicating a bitmap of positions of distributed RUs, and the third scheme indicating an index of a predefined RU distribution;
receiving a downlink submap and an uplink submap according to the control header; and
transceiving data through the downlink channel and the uplink channel,
wherein the downlink submap and the uplink submap are sequentially allocated to a first symbol column in the resource area configured by symbol columns and subchannel rows, and a remainder of the uplink submap is allocated to a first subchannel row when the whole of the uplink submap is not allocated to the first symbol column.

15. The method according to claim 1,
wherein the uplink submap information indicates a number of control allocation units (CAUs) in case of a scalable time division multiplexing scheme; and
wherein the uplink submap information indicates a position or number of RUs in case of a hybrid time and frequency multiplexing scheme.

* * * * *